(12) United States Patent
Tjerrild

(10) Patent No.: US 11,428,255 B2
(45) Date of Patent: Aug. 30, 2022

(54) WALL MOUNTING ASSEMBLY

(71) Applicant: Food Grade Solutions, LLC, Fowler, CA (US)

(72) Inventor: James Tjerrild, Clovis, CA (US)

(73) Assignee: Food Grade Solutions, LLC, Fowler, CA (US)

( * ) Notice: Subject to any disclaimer, the term of this patent is extended or adjusted under 35 U.S.C. 154(b) by 50 days.

(21) Appl. No.: 16/995,497

(22) Filed: Aug. 17, 2020

(65) Prior Publication Data
US 2020/0378427 A1    Dec. 3, 2020

Related U.S. Application Data

(63) Continuation-in-part of application No. 15/941,355, filed on Mar. 30, 2018, now Pat. No. 10,746,216.

(51) Int. Cl.
| | |
|---|---|
| *F16B 13/08* | (2006.01) |
| *F16B 13/06* | (2006.01) |
| *F16B 13/00* | (2006.01) |
| *F16M 13/02* | (2006.01) |
| *F16B 5/06* | (2006.01) |

(52) U.S. Cl.
CPC .......... *F16B 13/0858* (2013.01); *F16B 5/065* (2013.01); *F16B 5/0685* (2013.01); *F16B 13/003* (2013.01); *F16B 13/066* (2013.01); *F16B 2013/009* (2013.01); *F16M 13/02* (2013.01)

(58) Field of Classification Search
CPC .. F16B 13/0858; F16B 13/0833; F16B 13/04; F16B 13/06; F16B 13/063; F16B 13/065; F16B 13/066; F16B 5/065; F16B 5/0685; F16B 2013/009; F16B 13/045; F16B 13/0841; F16B 13/002; F16B 13/124; F16B 13/00; F16B 13/14; F16B 13/004; F16M 13/02
USPC ............ 248/65, 547, 231.91; 411/80.1, 80.2, 411/178, 176, 325, 271, 57.1
See application file for complete search history.

(56) References Cited

U.S. PATENT DOCUMENTS

| | | |
|---|---|---|
| 784,845 A | 3/1905 | Evans |
| 1,108,922 A | 9/1914 | Menten |
| 1,168,257 A | 1/1916 | Kennedy |
| 1,346,578 A | 7/1920 | Windsor |

(Continued)

*Primary Examiner* — Ingrid M Weinhold
(74) *Attorney, Agent, or Firm* — Neal, Gerber & Eisenberg LLP; Bradley Rademaker; Nawshaba Siddiquee

(57) ABSTRACT

Embodiments include a mounting assembly for securing a supported element to a wall structure having an internal thickness. The mounting assembly comprises an internal assembly configured to engage the internal thickness of the wall structure and comprising a central anchor assembly with an anchor portion and a mating portion annularly arranged about an open end of the anchor portion, the mating portion having a first end fixedly attached to the anchor portion adjacent the open end and a second end for engaging the outer wall panel. The internal assembly further comprises a plurality of elongated anchors attached to the mating portion at an oblique angle relative to a central axis of the anchor portion. The mounting assembly further comprises an external assembly for engaging the outer wall panel and the mating portion of the central anchor assembly; and an elongated fastener for securing the external assembly to the internal assembly.

27 Claims, 18 Drawing Sheets

(56) References Cited

U.S. PATENT DOCUMENTS

| | | | | |
|---|---|---|---|---|
| 1,360,200 | A | 11/1920 | Dowd | |
| 1,370,319 | A | 3/1921 | Kennedy | |
| 1,373,188 | A | 3/1921 | Goewey | |
| 1,600,034 | A | 9/1926 | Brenizer | |
| 1,705,086 | A | 3/1929 | Ferguson | |
| 1,835,243 | A | 12/1931 | Schaffert | |
| 2,061,634 | A | 11/1936 | Pleister | |
| 2,150,080 | A | 3/1939 | Rawlings | |
| 2,226,168 | A * | 12/1940 | Kass | A47G 1/1653 248/547 |
| 2,288,439 | A * | 6/1942 | Dahm | A47G 1/20 248/217.2 |
| 3,532,024 | A | 10/1970 | Gutshall | |
| 3,662,644 | A | 5/1972 | Flesch et al. | |
| 3,711,138 | A | 1/1973 | Davis | |
| 3,813,986 | A | 6/1974 | McVittie | |
| 4,079,655 | A | 3/1978 | Roberson, Jr. | |
| 4,432,683 | A | 2/1984 | Polos | |
| 4,573,844 | A | 3/1986 | Smith | |
| 4,657,461 | A | 4/1987 | Smith | |
| 4,704,057 | A | 11/1987 | McSherry | |
| 4,795,294 | A * | 1/1989 | Takada | A47G 1/22 248/547 |
| 4,856,951 | A | 8/1989 | Blucher et al. | |
| D313,344 | S | 1/1991 | Tritle | |
| 4,997,327 | A | 3/1991 | Cira | |
| 5,224,807 | A | 7/1993 | Belser | |
| 5,339,593 | A | 8/1994 | Ludwig et al. | |
| 5,346,169 | A * | 9/1994 | Polonsky | A47G 1/22 248/225.11 |
| 5,573,548 | A | 11/1996 | Nazre et al. | |
| D381,892 | S | 8/1997 | Porter et al. | |
| 5,682,678 | A | 11/1997 | Gallagher et al. | |
| 5,692,864 | A | 12/1997 | Powell et al. | |
| D398,363 | S | 9/1998 | LoBue | |
| 5,964,783 | A | 10/1999 | Grafton et al. | |
| 5,980,174 | A | 11/1999 | Gallagher et al. | |
| 6,361,258 | B1 | 3/2002 | Heesch | |
| 6,367,224 | B1 * | 4/2002 | Leek | F16B 9/054 403/187 |
| 6,558,094 | B2 * | 5/2003 | Nehl | F16B 13/061 411/908 |
| 6,635,058 | B2 | 10/2003 | Beyar et al. | |
| 6,679,661 | B2 | 1/2004 | Huang | |
| 6,702,534 | B2 | 3/2004 | Filipp | |
| 6,821,069 | B2 | 11/2004 | Ikuta | |
| 7,651,056 | B2 | 1/2010 | Tjerrild | |
| 7,654,781 | B2 * | 2/2010 | McDuff | F16B 13/061 411/30 |
| 7,727,235 | B2 | 6/2010 | Contiliano et al. | |
| 7,766,299 | B2 * | 8/2010 | Titus, II | G09F 15/0025 52/157 |
| 7,926,766 | B2 | 4/2011 | Tjerrild | |
| 7,931,242 | B2 | 4/2011 | Tjerrild | |
| 7,934,895 | B2 | 5/2011 | Ernst et al. | |
| 7,985,040 | B2 | 7/2011 | Cao | |
| 8,057,147 | B2 | 11/2011 | Ernst et al. | |
| 8,112,864 | B2 | 2/2012 | Vincent | |
| 8,448,910 | B2 | 5/2013 | Ernst et al. | |
| 8,511,035 | B2 | 8/2013 | Zimmer et al. | |
| 8,740,527 | B2 | 6/2014 | Cheng | |
| 8,832,920 | B2 | 9/2014 | Goldberg | |
| 8,925,172 | B2 | 1/2015 | English | |
| 9,273,710 | B1 | 3/2016 | Chang | |
| 9,291,188 | B2 | 3/2016 | English | |
| 9,458,717 | B2 * | 10/2016 | Fechte-Heinen | E21D 21/0086 |
| D816,469 | S | 5/2018 | Toomey | |
| 9,958,000 | B2 | 5/2018 | Chang | |
| 11,181,225 | B2 * | 11/2021 | Kawaguchi | H04N 5/64 |
| 2002/0173822 | A1 | 11/2002 | Justin et al. | |
| 2004/0208721 | A1 | 10/2004 | Kuenzel | |
| 2004/0208722 | A1 | 10/2004 | Kuenzel | |
| 2004/0253075 | A1 | 12/2004 | Liebig et al. | |
| 2005/0035264 | A1 * | 2/2005 | Marks | A47G 1/22 248/217.2 |
| 2005/0210771 | A1 | 9/2005 | Kuenzel | |
| 2006/0178246 | A1 | 8/2006 | Tjerrild | |
| 2006/0186278 | A1 | 8/2006 | Tjerrild | |
| 2008/0124188 | A1 | 5/2008 | Chang et al. | |
| 2008/0253860 | A1 | 10/2008 | McDuff et al. | |
| 2009/0022564 | A1 | 1/2009 | Summerfield | |
| 2009/0090820 | A1 | 4/2009 | Tjerrild | |
| 2009/0208310 | A1 | 8/2009 | Ikuta | |
| 2010/0084519 | A1 | 4/2010 | Tjerrild | |
| 2011/0117355 | A1 | 5/2011 | Selle | |
| 2011/0163208 | A1 | 7/2011 | Tjerrild | |
| 2012/0183371 | A1 | 7/2012 | Druschel et al. | |
| 2012/0328392 | A1 | 12/2012 | Difante | |
| 2013/0269170 | A1 | 10/2013 | Goldberg | |
| 2014/0017026 | A1 | 1/2014 | Cheng | |
| 2015/0023760 | A1 | 1/2015 | Bove, III et al. | |
| 2015/0117979 | A1 | 4/2015 | Anderson | |
| 2015/0176624 | A1 | 6/2015 | Bosco | |
| 2015/0313659 | A1 | 11/2015 | Miyawaki et al. | |
| 2019/0301505 | A1 | 10/2019 | Tjerrild | |
| 2019/0301508 | A1 | 10/2019 | Tjerrild | |
| 2021/0215182 | A1 * | 7/2021 | Talpe | F16B 41/002 |

\* cited by examiner

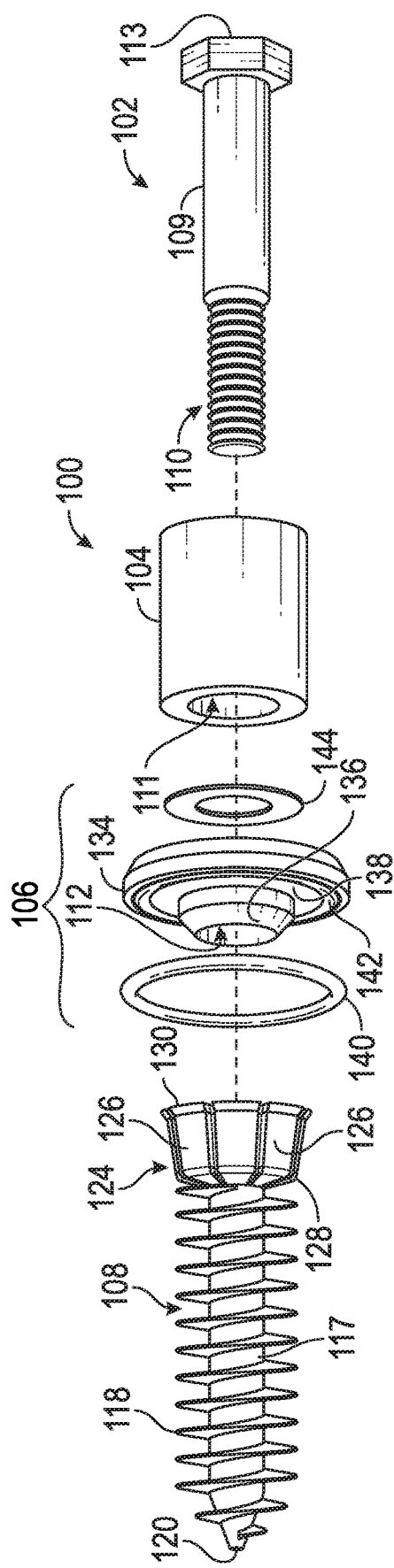
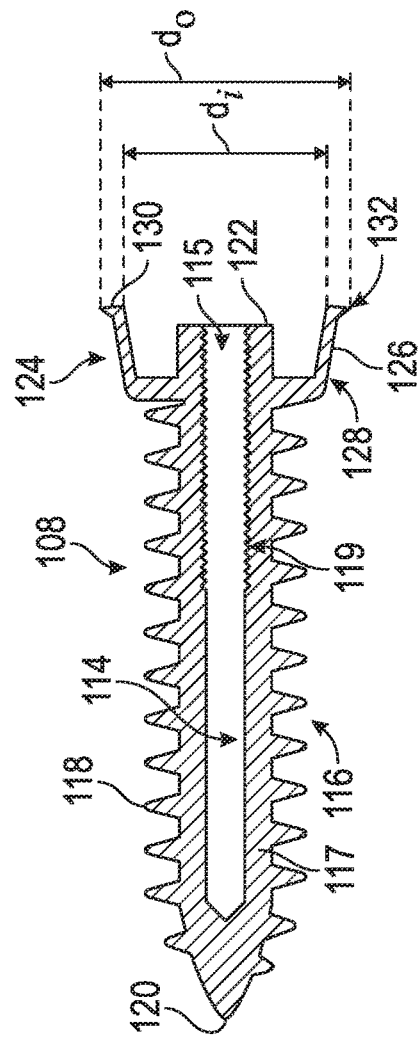
FIG. 1
FIG. 2

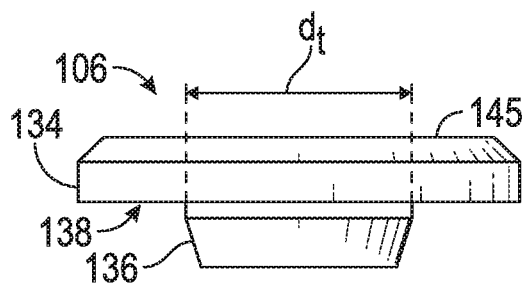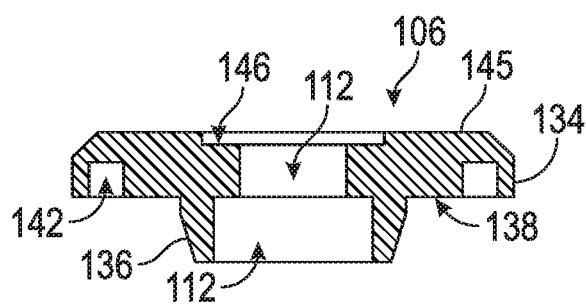
FIG. 7    FIG. 8
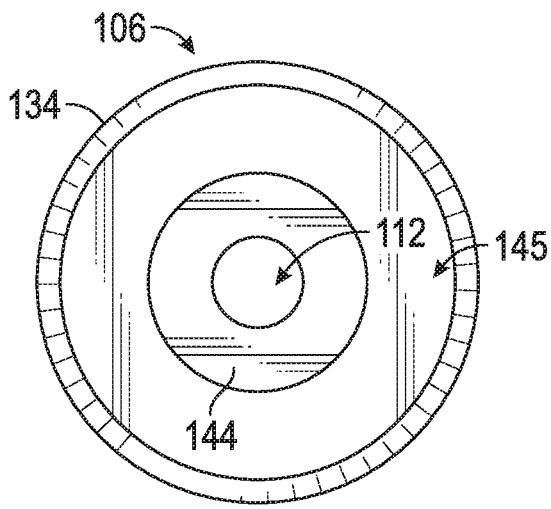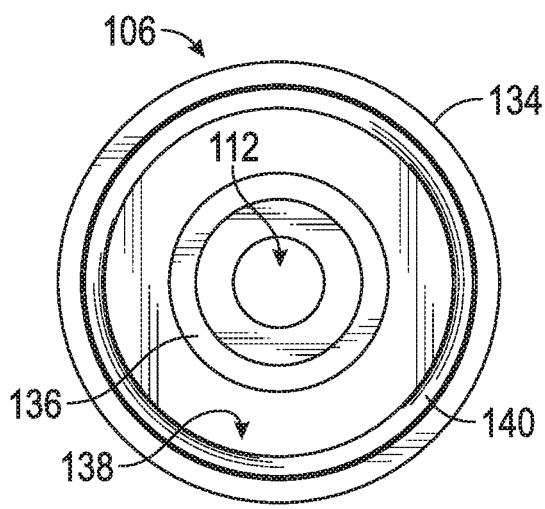
FIG. 9    FIG. 10
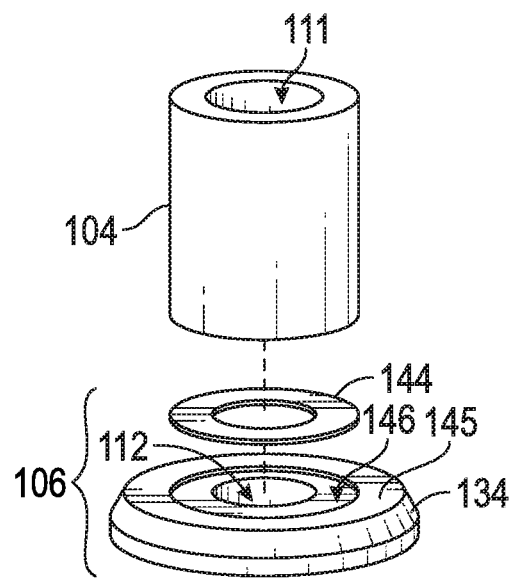
FIG. 11

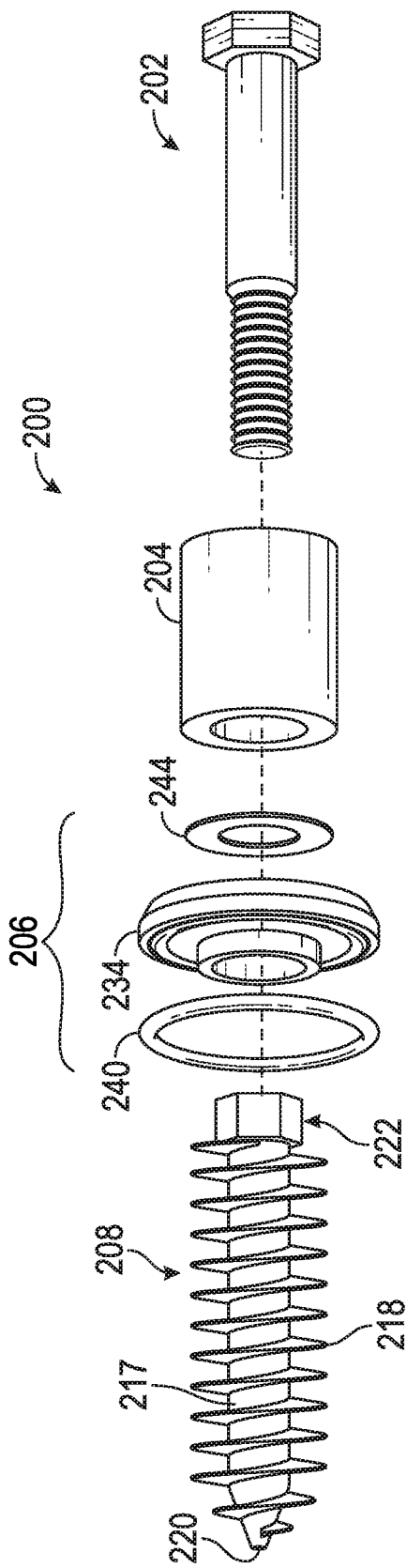
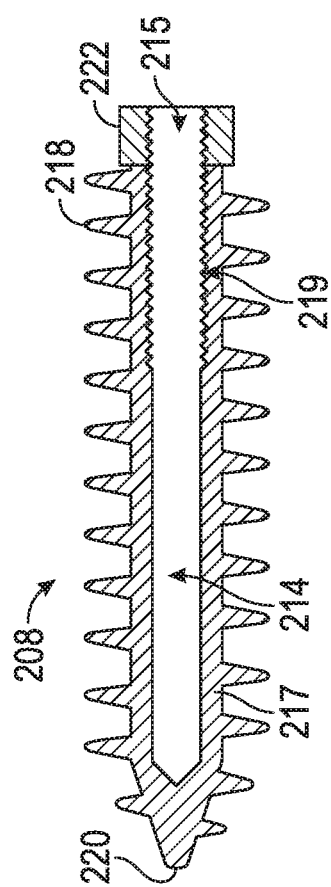
FIG. 12
FIG. 13

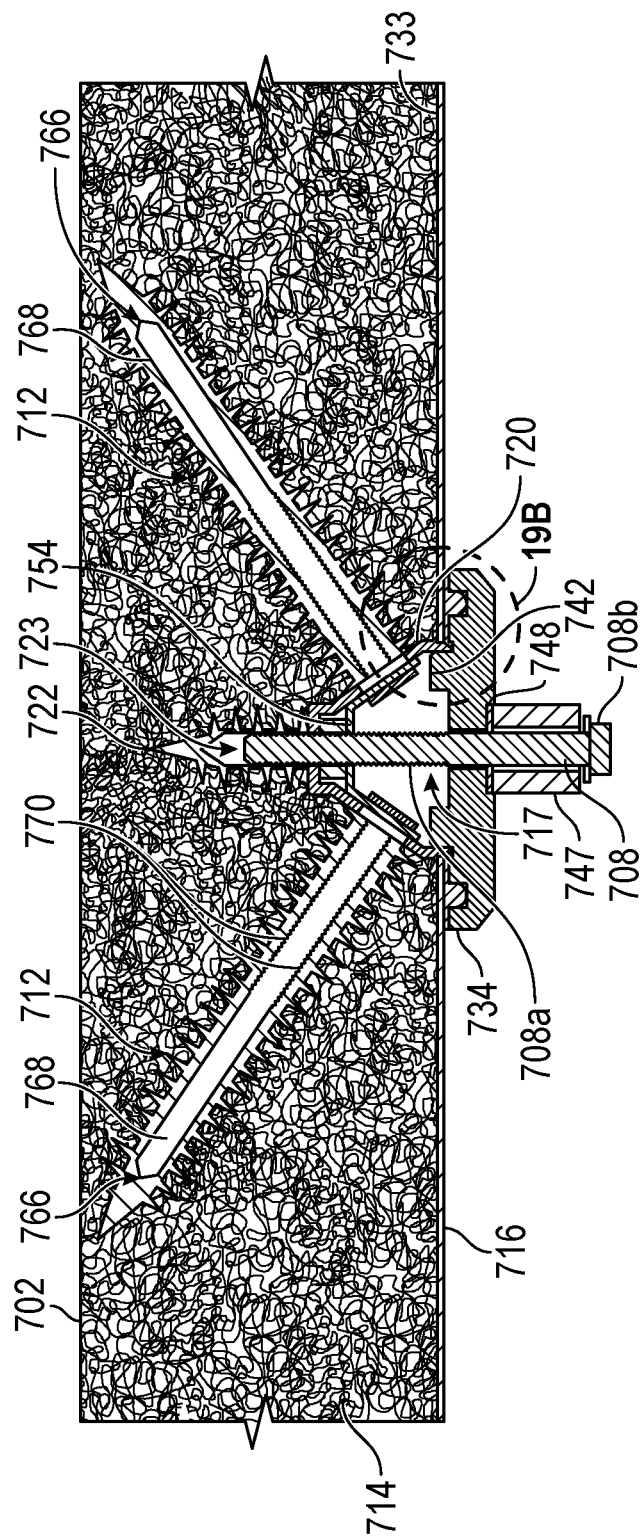
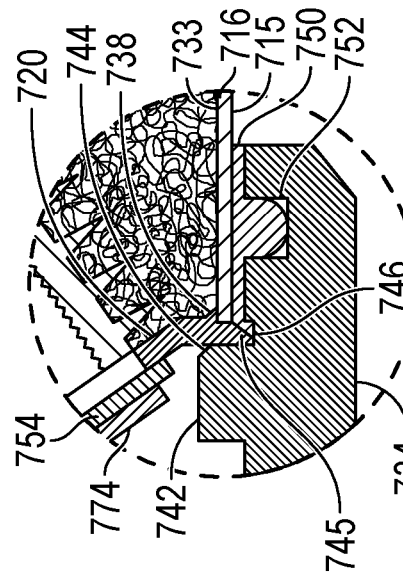
FIG. 19A
FIG. 19B

WALL MOUNTING ASSEMBLY

CROSS-REFERENCE TO RELATED APPLICATIONS

This application is a continuation in part to U.S. patent application Ser. No. 15/941,355, filed on Mar. 30, 2018, the contents of the application is fully incorporated herein by reference.

BACKGROUND

The description that follows relates to a mounting assembly for securing an object to a wall, ceiling, or other support structure. More specifically, the description relates to a wall or ceiling mounting assembly intended to be used in food processing, pharmaceutical processing, and other facilities that require a high degree of cleanliness or enhanced sanitation.

Food processing and pharmaceutical processing facilities typically use conventional mounting systems to install pipes, conduit, and tubes. These conventional mounting systems are difficult to inspect and clean and tend to be prone to contamination, thus rendering them inherently dirty and possibly leading to food and drug safety issues. For example, conventional mounting systems may be used to mount pipes, conduits, and tubes to vertical and horizontal surfaces (e.g., walls). As will be appreciated, upward facing surfaces are especially at risk for collecting contaminants, falling debris, and water from wash downs. While the food and pharmaceutical processing facilities may be designed with enhanced sanitation in mind, the conventional mounting systems themselves can include horizontal surfaces or upward facing channels that are prone to contamination such as by collecting dust and debris on surfaces. Also, any unused slots or holes within the mounting system provide areas in which dirt, debris, and other contaminants can collect.

Further, any surface that cannot be easily inspected or cleaned can be susceptible to harboring filth and mildew and allow for collection of hazardous dust from food preparation or manufacturing process. For example, some conventional mounting systems are typically mounted directly onto the wall and the systems are designed such that small gaps exist between the mounting system and the wall, and these gaps are not easily accessible for inspection or cleaning. As another example, some conventional mounting systems include exposed threaded surfaces that are difficult to clean and tend to collect debris. Some mounting systems may require disassembly in order to achieve an adequate level of cleaning.

Moreover, most conventional mounting systems cannot be securely fastened to laminated foam wall panels, as are commonly used in the wall and/or ceiling structures of food and pharmaceutical processing facilities. For example, the insulated wall panel products sold by Kingspan®, such as the Mineral Fiber (MF) Fire Rated wall panel system, have a compressible interior made of foam and a hard exterior or cladding made of metal (e.g., aluminum, stainless steel, etc.) or the like. The wall mounting screws found in many conventional mounting systems are not ideal for gripping the foam interior of such wall panels and staying in place for mounting a load, such as a conduit, pipe, or the like. Moreover, existing wall mounting screws do not provide a suitable mounting assembly for food preparation areas where it is important to prevent collection of dust and to allow for cleaning of the mounting assembly.

Accordingly, there is still a need in the art for wall mounting assemblies that are suitable for locations requiring a high degree of cleanliness, can resist contamination, can support a load, and are easy to inspect and clean.

SUMMARY OF THE INVENTION

The invention is intended to solve the above-noted problems by providing, among other things, a mounting assembly capable of securing a supported element, such as pipes, conduit, or tubes, to a wall, ceiling, or other support structure, while providing enhanced sanitation suitable for food grade and pharmaceutical grade installations. For example, the wall mounting assembly is configured to resist contamination and is easy to clean and inspect.

The invention is particularly advantageous for use with a wall, ceiling, or other support structure in a food processing facility or manufacturing area that includes laminated foam panels, as is commonly used in such areas (e.g., wall panel products such as Kingspan® Insulated Panels), as techniques for securing a mounting bracket to said support structure was previously unavailable.

One exemplary embodiment provides a mounting assembly for securing a supported element to a wall structure having an outer wall panel and an internal thickness. The mounting assembly comprises an internal assembly configured to engage the internal thickness of the wall structure, the internal assembly comprising a central anchor assembly. The central anchor assembly comprises an anchor portion configured for insertion into the internal thickness of the wall structure, the anchor portion having an open end, an opposing closed end, and an internal passageway extending between the two ends, and a mating portion annularly arranged about said open end of the anchor portion, the mating portion having a first end fixedly attached to the anchor portion adjacent the open end and an opposing second end configured to engage the outer wall panel. The internal assembly further comprises a plurality of elongated anchors configured for attachment to the mating portion at an oblique angle relative to a central axis of the anchor portion, each elongated anchor having a threaded outer wall and a closed pointed end configured to cut into the internal thickness of the wall structure. The mounting assembly further comprises an external assembly comprising an open center and configured to engage the outer wall panel and the mating portion of the central anchor assembly; and an elongated fastener configured to secure the external assembly to the internal assembly, the elongated fastener extending through the open center of the external assembly and into the internal passageway of the anchor portion.

Another exemplary embodiment provides a method of mounting a supported element to a wall structure having an outer wall panel and an internal thickness. The method comprises forming a hole having a first diameter through the outer wall panel; providing a central anchor assembly with an anchor portion fixedly attached to a mating portion adjacent an open end of the anchor portion, said anchor portion further comprising a closed end opposite the open end and an elongated internal passageway extending between the two ends; inserting the central anchor assembly into the hole and through the internal thickness of the wall structure until a bottom end of the mating portion engages the outer wall panel; coupling each of a plurality of elongated anchors to the mating portion at an oblique angle relative to a central axis of the anchor portion, each elongated anchor having a threaded outer wall and a closed end configured to cut into the internal thickness of the wall structure as the elongated anchor is inserted into the wall structure; coupling an external assembly to the central anchor assembly adjacent the outer wall panel; and inserting an elongated fastener through an open center of the external assembly and into the internal passageway of the anchor portion, thereby securing the external assembly to the central anchor assembly.

Another exemplary embodiment provides a mounting assembly for securing a supported element to a wall structure having an outer wall panel and an internal thickness, the mounting assembly comprising an internal assembly configured to engage the internal thickness of the wall structure and handle tension loads applied to the supported element, the internal assembly comprising a plurality of anchors configured to cut into the internal thickness and extend out at different angular directions relative to a central axis of the internal assembly; an external assembly configured to engage the outer wall panel and a mating portion of the internal assembly, and handle sheer loads applied to the supported element, the external assembly comprising a projection configured to apply a radially outward force against an extent of the mating portion upon coupling the external assembly to the internal assembly; and an elongated fastener for coupling the external assembly to the internal assembly, the elongated fastener extending through an open center of the external assembly and into an internal passageway of the internal assembly.

A better understanding of the invention will be obtained from the following detailed descriptions and accompanying drawings, which set forth illustrative embodiments that are indicative of the various ways in which the principals of the invention may be employed.

BRIEF DESCRIPTION OF THE DRAWINGS

FIG. 1 is an exploded perspective view of an exemplary fastener assembly, in accordance with certain embodiments;

FIG. 2 is a cross-sectional side view of an exemplary wall anchor included in the fastener assembly of FIG. 1, in accordance with certain embodiments;

FIG. 7 is a side view of an exemplary washer assembly included in the fastener assembly of FIG. 1, in accordance with certain embodiments;

FIG. 8 is a cross-sectional side view of an exemplary washer included in the washer assembly of FIG. 7, in accordance with certain embodiments;

FIG. 9 is a top view of the washer assembly shown in FIG. 7, in accordance with certain embodiments;

FIG. 10 is bottom view of the washer assembly shown in FIG. 9, in accordance with certain embodiments;

FIG. 11 is an exploded perspective view of an exemplary spacer and the exemplary washer assembly included in the fastener assembly of FIG. 1, in accordance with certain embodiments;

FIG. 12 is a exploded perspective view of another exemplary fastener assembly, in accordance with certain embodiments;

FIG. 13 is a cross-sectional side view of an exemplary wall anchor included in the fastener assembly of FIG. 12, in accordance with certain embodiments.

FIG. 19A is a cross-sectional side view of the fastener assembly of FIG. 18 attached to a wall panel, in accordance with certain embodiments.

FIG. 19B is a close-up, cross-sectional view of a section of the fastener assembly shown in FIG. 19A, in accordance with certain embodiments.

Figure 3:
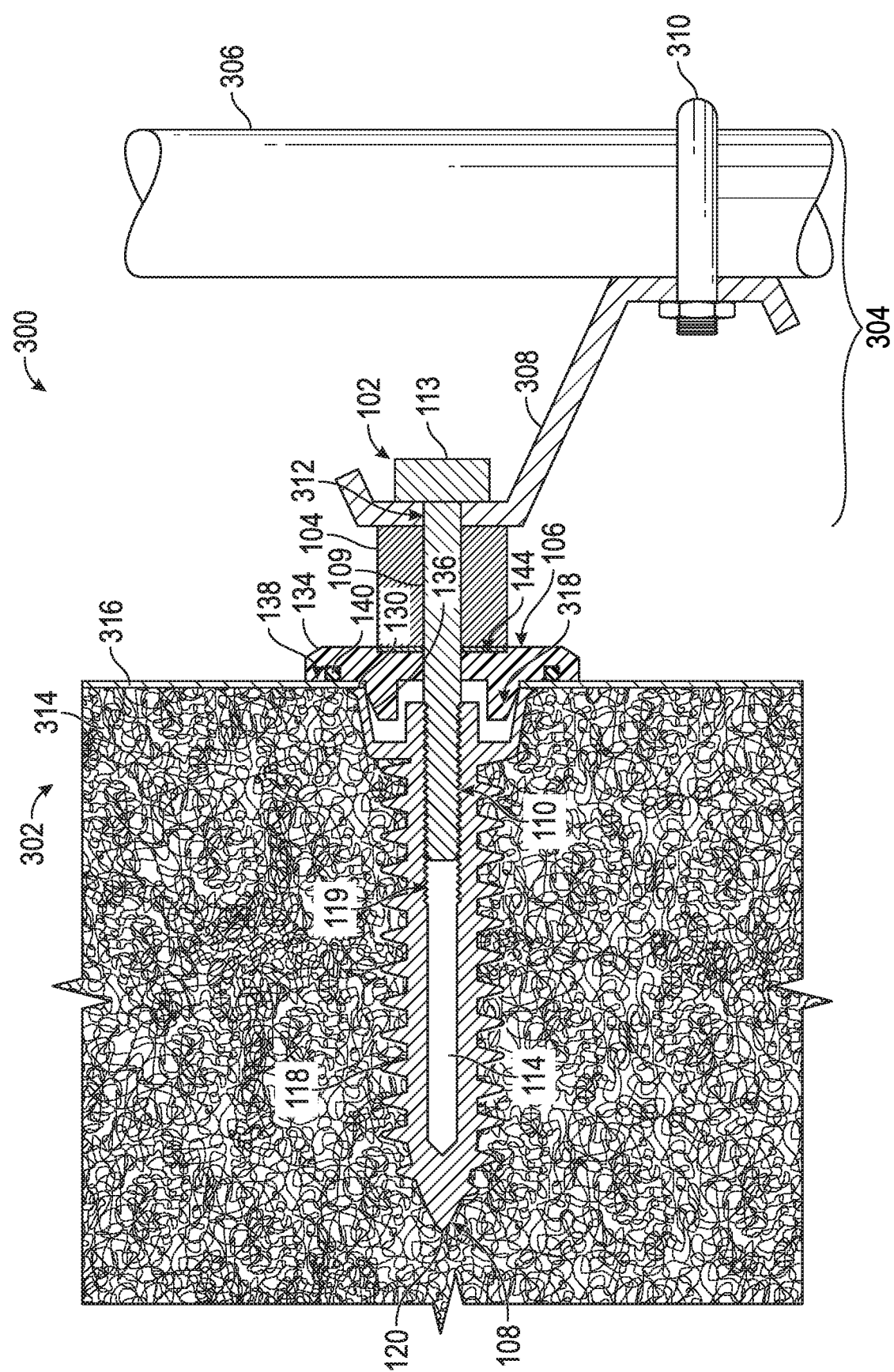
FIG. 3 is a cross-sectional side view of a wall mounting assembly attached to a wall panel, the wall mounting assembly including the fastener assembly of FIG. 1 and an exemplary mounting bracket or strut assembly, in accordance with certain embodiments.

Illustrative and exemplary embodiments of the invention are described in further detail below with reference to and in conjunction with the figures.

DETAILED DESCRIPTION OF DRAWINGS

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

FIG. 1 is an exploded view of an exemplary fastener assembly 100 configured for mounting a supported element to an upright support, in accordance with embodiments. For example, as shown in FIG. 3, the fastener assembly 100 can be used to mount a strut member or other wall hanger comprising a surface for attachment to a pipe, conduit, or tube, to a wall or other vertical or generally vertical surface. In some cases, the fastener assembly 100 may be used to mount a strut member to a horizontal surface, such as a ceiling. In some embodiments, the fastener assembly 100 may be provided as a kit for mounting the assembly 100 to a wall and said kit may further include one or more tools configured to facilitate said installation, such as, for example, a driver (e.g., drill bit, ratchet, etc.) or other suitable tool. In an embodiment of the kit according to the present invention, each of the components described herein may be provided together, optionally in a package containing the collection of parts for a full assembly of the device or optionally in a collection of parts for multiple assemblies. The kit may include the parts for one or more assemblies, with tools used for installation and practice of the method described herein—such as a driver tool for inserting the anchor (such as a driver tool that may be attached to a power drill or ratchet—and may include a drill bit configured for boring a hole in the panel or laminate of the panel with suitable dimension and depth for inserting the anchor into the panel material and thereby securing the anchor within the panel.

As shown in FIG. 1, the fastener assembly 100 comprises a plurality of separate components that are configured (e.g., sized and shaped) to be assembled together to mount a strut member or other element to a wall or wall panel. The separate components include an elongated fastener 102, a spacer 104, a washer assembly 106, and an anchor 108. According to embodiments, the anchor 108 is configured to engage the wall panel, or be inserted into the wall panel. The washer assembly 106 is configured for coupling to both the anchor 108 and the wall panel. The spacer 104 is configured for attachment to the washer assembly 106, opposite the wall panel, and to the strut member. Optionally, the washer assembly may comprise an integral spacer body, thus optionally providing an assembly which need not include a separate spacer 104. The elongated fastener 102 is configured for securing all of the separate components together and to the wall panel. As shown in FIG. 3, a portion of the fastener assembly 100, including the spacer 104 and a portion of the washer assembly 106, is configured to remain exposed or protrude out from the wall panel after securing the fastener assembly 100 to the wall, and a remaining portion of the fastener assembly 100, including the anchor 108, is configured to extend into and attach to the internal thickness 314 of the wall panel 302.

In embodiments, the fastener assembly 100 is especially designed for use in locations that require a high degree of cleanliness, such as food processing plants and pharmaceutical manufacturing installations. For example, one or more components of the fastener assembly 100, such as, e.g., the anchor 108, can be specifically configured for secure fastening to a laminate foam wall panel typically used in food processing plants and other industrial-level, clean environments (e.g., as shown in FIG. 3). Such wall panels include a compressible, foam (or Styrofoam) interior which is difficult to grip with a conventional metal screw. Also, an extent of the fastener assembly 100 that remains exposed after installation can be configured to be generally without a horizontal surface, and thereby avoid collection of dust. As will be appreciated, exposed horizontal surfaces, such as those found in conventional wall mounting assemblies, can harbor contaminants including filth and mildew, as they tend to collect dust and debris along with water from wash downs.

In some embodiments, the areas of the fastener assembly 100 that remain exposed after installation are further configured to repel contaminants and to be easy to inspect and clean. For example, one or more of the exposed surfaces, such as, e.g., fastener 102 and/or spacer 104, may be made with stainless steel and polished to a #4 sanitary finish, or the like. As another example, the washer assembly 106 can be configured to create a tight seal with the wall panel, so as to prevent the formation of small gaps between the wall and the fastener assembly 100, as will be described in more detail below. It should be appreciated that small gaps or crevices, such as those found in conventional mounting assemblies, can be difficult to inspect and clean or allow water or cleaning solution to pass into the mounting area of the assembly and/or the opening in the wall panel that is needed for mounting. At the same time, the fastener assembly 100 is configured to hold the supported element (e.g., strut member) a predetermined distance away from the wall (see, e.g., FIG. 3), for example, using the spacer 104 (or upper spacer body of the washer assembly 102), with the predetermined distance being selected so that contaminants can easily fall downwards in the gap formed between the wall and the strut member. In conventional mounting assemblies, the strut member may be mounted so close to the wall that the gap formed therebetween is not easily inspectable or cleanable. Further, in conventional mounting assemblies, a gasket seal is not available for suitably sealing the external environment from the opening in the wall structure that is needed for mounting. In the present embodiment shown and described, the invention provides an enlarged diameter of a washer assembly 106 which includes a gasket (140, 240) to seal the surface engagement between the washer assembly 102 and the surface of the wall structure (316, 416).

These and other advantages of the fastener assembly 100 will become apparent based on the disclosure provided herein.

Referring back to FIG. 1, the separate components of the fastener assembly 100 will now be described in more detail.

The spacer 104 and the washer assembly 106 each have a generally annular body that is configured to receive an extent of the elongated fastener 102 there through, such as, for example, first portion 109 shown in FIG. 1. In an embodiment, the spacer 104 is formed as an upper extending body of the washer assembly 106, either as a unified assembly or one of disassembled parts. Another extent of the fastener 102, such as, for example, second portion 110 shown in FIG. 1, is securely received by the anchor 108 (e.g., as shown in FIG. 3). In embodiments, an overall length of the elongated fastener 102 is selected so that, upon assembly, the fastener 102 extends through an open center 111 of the spacer 104, through an open center 112 of the washer assembly 106, and into a central passageway 114 of the anchor 108, leaving only a drive head 113 of the fastener 102 exposed or visible. In embodiments, the elongated fastener 102 may be a commercially-available metal bolt or screw, such as, for example, a hex bolt, a cap screw, a lag bolt, a button head bolt, a pan head bolt, or any other suitable style or type of fastener. The exact size or dimensions (e.g., body length, head diameter, etc.) of the fastener 102 may be selected based on one or more dimensions of the spacer 104 and/or other components of the fastener assembly 100, and/or one or more dimensions of a supported element attached to the fastener assembly 100, such as, e.g., the strut member shown in FIG. 3. As an example, the head 113 of the elongated fastener 102 may be a hex head, and the fastener 102 may have a diameter of 8-32, 10-32, ¼ inch, 5/16 inch, ⅜ inch, ½ inch (or similar metric sizes), and the length of the fastener 102 may be 2 inches, 2.5 inches, 3 inches, etc. In one preferred embodiment such as is shown in the Figures, the elongated fastener 102 is a Type 304 Stainless Steel Hex Bolt, or Hex Head Cap Screw, with a ⅜ inch diameter a body length of at least 2 inches and right hand national coarse threads (e.g., 16TPI).

As shown in FIG. 1, the first portion 109 of the elongated fastener 102 can have a plain or smooth surface, like the inner surfaces of the spacer 104 and the washer assembly 106, so that the first portion 109 can easily pass through and reside within the hollow portion 111 of the spacer 104 and the open center 112 of the washer assembly 106. As shown in FIG. 1, the second portion 110 has a threaded surface. The smooth, inner surfaces of the spacer 104 and the washer assembly 106 also allow the second, or remaining, portion 110 of the fastener 102 to easily pass there through, on its way to the anchor 108.

In embodiments, a length of the first portion 109 can be selected based on, or set substantially equal to, a length of the spacer 104 and an overall length of the washer assembly 106. In such cases, the first portion 109 can be housed entirely or substantially within the spacer 104 and the washer assembly 106 upon assembly, thus preventing a surface area of the first portion 109 of the fastener 102 from being exposed after coupling the fastener assembly 100 to a wall (e.g., as shown in FIG. 3).

Referring additionally to FIG. 2, shown is a cross-sectional view of the anchor 108 in accordance with embodiments. As illustrated, the anchor 108 has an elongated body 116 comprised of an outer wall 117 and helical threads 118 extending radially outward along an extent of the outer wall 117. The anchor 108 further includes a hollow center, or central passageway 114, formed within and extending substantially through an extent of the elongated body 116. The central passageway 114 has an open end 115 and is configured to securely receive, via the open end 115, the second portion 110 (a threaded shaft portion) of the elongated fastener 102. For example, at least a portion of the central passageway 114 includes a threaded surface 119 configured to engage the threaded shaft 110 of the fastener 102. In a preferred embodiment, the threads of the threaded surface 119 may be sized and shaped to match or correspond to the threads of the second portion 110 of the fastener 102. A length of the second portion 110 of the fastener 102 can be selected so that, upon assembly, the second portion 110 is entirely or substantially housed within the central passageway 114 of the anchor 108. This prevents a surface area of the second portion 110 of the fastener 102 from being exposed after coupling the fastener assembly 100 to a wall (e.g., as shown in FIG. 3).

Referring additionally to FIG. 3, shown is a cross-sectional view of a wall mounting assembly 300 coupled to a wall or wall panel 302, in accordance with embodiments. The wall mounting assembly 300 includes the fastener assembly 100 shown in FIG. 1 and a strut assembly 304 coupled to a supported element 306. The supported element 306 can be a pipe, conduit, tube, or the like. The strut assembly 304 includes a strut 308, or strut member, coupled to the fastener assembly 100 on one end and to the supported element 306 on the other end. The strut assembly 304 also includes a fastener 310 for securing the strut 308 to the supported element 306. The fastener 310 can be a U-bolt or any other suitable device for attaching the supported element 306 to the strut 308.

In embodiments, the strut 308 includes a hole 312 for receiving the elongated fastener 102 of the fastener assembly 100. The hole 312 may be pre-drilled into the strut 308, or formed (e.g., punched, drilled, etc.) on site at the time of mounting the strut assembly 304 to the wall 302, and optionally may be a slot type hole to allow for adjustability during assembly. The hole 312 can be configured to be smaller than the drive head 115 of the fastener 102 and at least large enough to receive the first portion 110 of the fastener 102. In a preferred embodiment, the hole 312 is configured to have a diameter that is substantially equal to the diameter of the first portion 110, so as to eliminate or minimize open space between the hole 312 and the first portion 110 of the fastener 102.

As shown in FIG. 3, the strut 308 can be configured to angle the supported element 306 away from the wall 302, or at least substantially parallel to the wall 302. In embodiments, the strut 308 may be substantially similar to the strut shown and described in U.S. Pat. No. 7,651,056, filed on Oct. 12, 2005 and entitled "Method of Mounting Support Assemblies for Pipes, Conduits, and Tubes," which has the same inventor as the present disclosure and is incorporated by reference herein in its entirety.

In embodiments, the wall 302 can be comprised of a thick, inner portion 314 (also referred to herein as an "internal thickness") overlaid by a thin panel 316 (also referred to herein as a "laminate outer cover"), as shown in FIG. 3. The inner portion 314 may be constructed of thick foam or foam board, or other sturdy, compressible material capable of being penetrated by the anchor 108, but also capable of at least partially supporting a weight of the wall mounting assembly 300 and the supported element 306. The thin panel 316 may be a laminate cover or sheet metal cladding made of stainless steel or other material suitable for highly sanitary installations. The laminate cover 316 may be attached to the inner portion 314 using adhesive or other suitable technique. In some embodiments, the thickness of the inner portion 314 can be, for example, between 4 and 8 inches, while the thin cover 316 residing adjacent thereto can be significantly thinner (e.g., like a skin), as shown in FIG. 3.

As an example, the wall 302 may be an insulated wall panel sold by Kingspan®, such as the Mineral Fiber (MF) Fire Rated wall panel.

According to embodiments, one or more components of the anchor 108 can be configured to facilitate installation and/or insertion of the anchor 108 into the wall panel 302. For example, a distal end 120 of the anchor 108 may have a generally conical or tapered shape with a pointed and/or sharp tip to help create or bore a path through the thick foam as the anchor 108 is inserted into the inner portion 314 of the wall 302 during installation (see, e.g., FIGS. 15 and 16).

In addition, the anchor 108 preferably includes an extent of its length with helical threading 118 or similar auger outer arrangement, wherein the helical threading 118 is configured to cut through the compressible (or frangible) wall material without wandering (e.g., so as to move in a steady, straight line) and/or tearing. For example, the helical threads 118 can be formed of wide walls with thin, sharp edges spiraling around the outer wall 117, the edges being configured to cut through the compressible material of the inner wall portion 314 without tearing. In addition, an overall height of the helical threads 118 at one or more locations along the outer wall 117 can be selected so the threads 118 have a progressive or tapered profile. For example, the progressive thread profile along an extent of the length of the anchor 108 may be formed by gradually narrowing an overall height of the threads 118 as the threads 118 near the distal end 120, as shown in FIGS. 1 and 2. In some embodiments, the overall profile of the anchor 108 progressively narrows starting from a proximate end adjacent to the bottom end 128 of the upper crown 124 and ending at the distal end 120. In either case, the progressive thread profile can be configured so that the threads 118 gradually and steadily increase the size of the hole being formed through the compressible material as the anchor 108 travels deeper and deeper into the inner wall portion 314. Increasing the hole size in such a controlled manner can help prevent undesirable tearing of the compressible material and can guide the anchor 108 in a substantially straight line, or otherwise prevent the anchor 108 from wandering during insertion.

Furthermore, the anchor 108 can have a length configured to enable an extent of the outer wall 117 to be forced into and through the compressible material of the inner portion 314. In one exemplary embodiment, the anchor 108 has an overall length of about 3 to 4 inches (e.g., approximately 3.4 inches). This length plus the use of a sturdy, lightweight material (e.g., a hard plastic) and a progressive thread profile enable the elongated body 116 to be inserted, or screwed, into the inner portion 314 of the wall 302 with a controlled amount of resistance and torque. Further, the anchor 108 can include a drive head 122 configured for user engagement when forcing or inserting the elongated body 116 of the anchor 108 into the wall panel 302. As shown in FIG. 2, the drive head 122 can be coupled to the elongated body 116 adjacent the open end 115. The drive head 122 includes an opening in communication with the central passageway 114 for receiving the elongated fastener 102 there through.

The anchor 108 can also be configured to anchor or secure the remaining components of the fastener assembly 100 (also referred to herein as a "mounting assembly") to the wall panel 302, upon installation of the fastener assembly 100. For example, the helical threads 118 on the outer wall 117 of the anchor 108 can be configured to securely engage the foam board within the wall panel 302 to support the weight of the mounting assembly and any supported element coupled thereto. In some embodiments, the helical threads 118 can include course threading configured to firmly grip the compressible material of the wall panel 302 upon installation. Further, the anchor 108 can be made of a lightweight rigid material (e.g., plastic) to provide rigid outer threads 118 while providing compressible inner passageway 114 material when engaged with the rigid (metal) fastener 102.

Figure 4:
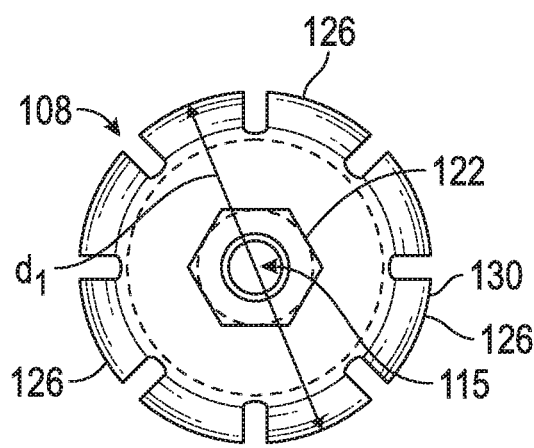
FIG. 4 is a top view of the wall anchor shown in FIG. 2, in a neutral position, in accordance with certain embodiments.

To further facilitate anchoring of the fastener assembly 100 to the wall panel 302, the anchor 108 includes an annular collar, or upper crown 124, arranged about the open end 115 of the central passageway 114 and the drive head 122. As also shown in FIG. 4, which is a top view of the anchor 108, the upper crown 124 comprises a plurality of circumferentially spaced elements 126 (e.g., fingers) that cooperate to form an outer crown diameter $d_o$ and give the crown 124 a generally castled shape. The crown elements 126 extend upwards from a base portion 128 of the crown 124. An extent of each crown element 126 also extends radially outward from a central axis of the base portion 128, so as to create an outwardly sloping wall around at least a portion of the crown 124. The extent of the crown elements 126 that slope or extend radially outwards can vary.

For example, in some embodiments, each crown element 126 ends at a substantially flat top rim 130 that is formed by a flange or protruding lip portion 132 extending radially outward from the rest of the element 126. In such cases, the outwardly sloping wall includes the sidewall that forms the protruding lip 132. In the exemplary embodiment of FIG. 2, the upwardly extending crown elements 126 also extend radially outwards, so that a longer portion of the crown wall (e.g., the entire length of the crown elements) forms the outwardly sloping wall. In another embodiment (for example, wall anchor 508 shown in FIGS. 15 and 16), the crown elements extend upward from, and generally perpendicular to, the base of the crown, so as to form a substantially straight crown wall. In such cases, only the protruding lip at the top rim of the crown elements forms the outwardly sloping crown wall. In yet another embodiment, the crown elements do not include the protruding lip, but an entire length of each crown element extends upwards and radially outwards from the base portion of the crown to form the outwardly sloping crown wall.

The following paragraphs will refer to the anchor 108 shown in FIGS. 1 and 2 to describe how the crown elements 124 move when a force is exerted on the crown 124. However, it should be appreciated that the same description/movement may apply to other embodiments of the wall anchor, such as, e.g., wall anchor 508 shown in FIGS. 15 and 16.

Referring back to FIG. 2, the top rim 130 has an inner diameter $d_i$ formed by the walls of the crown elements 126 and an outer diameter $d_o$ formed by the flange portion 132. In embodiments, the crown elements 126 are configured to move radially outward or radially inward in response to certain forces applied to the crown elements 126. These movements cause both the inner crown diameter $d_i$ and the outer crown diameter $d_o$ of the top rim 130 to be enlarged or reduced, respectively. For the sake of simplicity, the following examples will describe the change in the outer diameter $d_o$ of the top rim 130 during such movements. However, it will be appreciated that both diameters $d_o$ and $d_i$ may simultaneously change during these movements.

Figure 5:
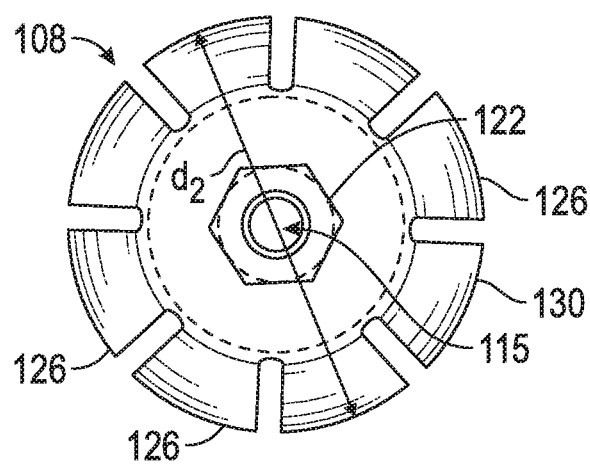
FIG. 5 is a top view of the wall anchor shown in FIG. 4, in an expanded position, in accordance with certain embodiments.
Figure 6:
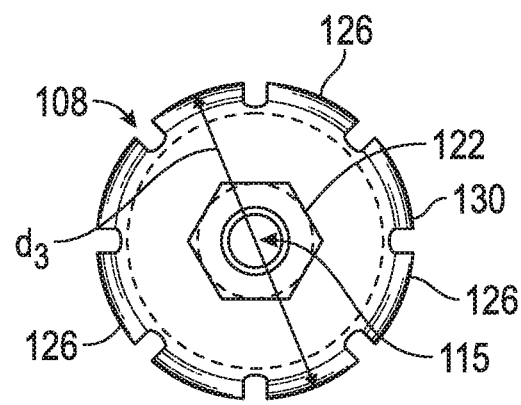
FIG. 6 is a top view of the wall anchor shown in FIG. 4, in a contracted position, in accordance with certain embodiments.

Referring now to FIGS. 4, 5 and 6, shown are top views of the anchor 108 to illustrate the changes in diameter of the top rim 130 during expansion and contraction of the crown 124 in response to forces applied to the crown elements 126, in accordance with embodiments. For example, FIG. 4 shows the crown 124 in a neutral or initial position, where the top rim 130 of the crown elements 126 has an initial diameter $d_1$. In FIG. 5, each of the crown elements 126 has been pushed or moved outwards radially, such that the diameter of the top surface 130 has been enlarged to a second diameter $d_2$ greater than the initial diameter $d_1$, thus placing the crown 124 in an expanded position. In FIG. 6, each of the crown elements 126 has been pressed or moved inwards, such that the diameter of the top surface 130 has been reduced to a third diameter $d_3$ smaller than the initial diameter $d_1$, thus placing the crown 124 in a contracted position.

In embodiments, the individual crown elements 126 move or deform in response to one or more forces applied to the crown 124 during installation of the anchor 108 into the wall panel 302. For example, in some embodiments, the crown elements 126 may be at least slightly compressed inwards towards the third diameter $d_3$ as the upper crown 124 passes through an opening 318 formed in the laminate outer cover 316 to receive the anchor 108. The compression of the crown elements 126 can be caused by, for example, selection of an opening size that is smaller than a diameter of the crown 124 (such as, e.g., the outer crown diameter $d_o$), such that the outwardly sloping crown elements 126 and/or the outwardly extending flange portion 132 are pressed inwards by the walls of the opening 318 as the crown 124 passes there through. In such cases, the reduced diameter $d_3$ may be substantially equal to, or less than, a diameter of the opening 318 that receives the crown 124. As another example, the crown elements 126 may be expanded toward the second diameter $d_2$ as a projection of the washer assembly 106 (see, e.g., projection 136 in FIG. 7) engages the crown elements 126 upon coupling the washer assembly 106 to the opening 318 in the wall panel 302, as described in more detail below. The expansion of the crown elements 126 can be caused by, for example, the size and shape of the washer projection as compared to the top rim 130. In such cases, the enlarged diameter $d_2$ may be substantially equal to or greater than a diameter of the washer projection inserted into the crown 124.

More specifically, in a preferred embodiment, the opening 318 is a substantially round hole cut from or drilled into the laminate cover 316 prior to installation of the fastener assembly 100. The opening 318 may have a characteristic diameter that is selected based on, or is determined by, a diameter of the anchor 108 and/or a diameter of the washer projection, as described in more detail below. In some embodiments, the characteristic diameter of the opening 318 is selected to be substantially equal to or greater than the inner crown diameter $d_i$ but smaller than the outer crown diameter $d_o$. As shown in FIG. 2, the outer diameter $d_o$ of the top rim 130 is at least slightly larger than the inner crown diameter $d_i$ due to the flange portion 132 extending out from the crown 124. Thus, making the opening 318 smaller than the outer crown diameter $d_o$ causes the crown elements 126 to be moved or pushed inward by the laminate cover which forms the sides of the opening 318, as the top rim 130 of the crown 124 is inserted into the opening 318 and until the flange portion 132 fits through the opening 318. Once the entire flange portion 132 passes through or clears the opening 318, the crown elements 126 move or spring back to their neutral positions, so that the outer diameter $d_o$ of the top rim 130 (e.g., initial diameter $d_1$) is restored. Thus, once fully inserted, the outer diameter of the crown 124 resides completely within the opening 318. In one exemplary embodiment, the outer diameter $d_o$ of the crown 124 is about 1.2 to 1.25 inches, while the inner diameter $d_i$ is about 1.1 to 1.15 inches.

As mentioned above, the crown elements 126 may also move in response to engaging with the washer assembly 106. As shown in FIGS. 1 and 7, the washer assembly 106 includes a main washer body 134 (also referred to herein as a "washer") with a projection 136 depending or extending down from an underside 138 of the washer 132. The washer assembly 106 is coupled to the wall panel 302 and the anchor 108 by inserting the projection 136 through the opening 318 until the underside 138 of the washer 132 approaches and preferably engages an exterior surface of the laminate cover 316, as shown in FIG. 3. The projection 136 has a beveled or inwardly sloping wall that is configured to engage with the anchor crown 124 (also referred to herein as a "mating portion" of the anchor 108), as the washer assembly 106 is inserted through the opening 318. As shown in FIG. 7, the beveled walls can extend from a cylindrical portion of the projection 136 that has a top diameter $d_t$ and is adjacent to the underside 138 of the washer 134. In embodiments, the top diameter $d_t$ is larger than the inner crown diameter $d_i$, but smaller than the outer crown diameter $d_o$. Thus, as the projection 136 is forced into the crown 124, the beveled walls of the projection 136 engage with and press against an inside of the top rim 130, such that the crown elements 126 are pushed in a radially outward direction, along the underside of the laminate cover 316, and the outer crown diameter $d_o$ is enlarged (e.g., to the second diameter $d_2$ shown in FIG. 5). The crown elements 126 keep moving outwards until the projection 136 is substantially inside the crown 124, or the top diameter $d_t$ is adjacent the top rim 130.

Once the washer 134 is inserted into the anchor crown 124, the crown elements 126 attached to the washer projection 136 as a ferrule. That is, the crown 124 exerts an inward pressure on the projection 136 as the crown elements 126 try to contract back to the initial position of the top rim 130 (e.g., initial diameter $d_1$ shown in FIG. 1). This pressure causes the crown elements 126 to deform around and grasp onto the projection 136, thus strengthening or securing the connection between the washer 134 and the anchor 108. At the same time, the cylindrical top of the projection 136 continues to exert an outward pressure on the crown elements 126, which maintains an expanded outer diameter of the crown 124 and thereby keeps the top rim 130 of the anchor crown 124 engaged with an underside of the laminate outer cover 316 adjacent to and surrounding the opening 318, as shown in FIG. 3. Such engagement of the crown 124 with the underside of the laminate cover 316 adjacent an outer rim of the opening 318, prevents the anchor 108 from being pulling out from the wall 302, or otherwise slipping back through the opening 318, thus securing the fastener assembly 100 to the wall panel 302.

In some embodiments, the characteristic diameter of the opening 318 is selected based on the top diameter $d_t$ of the washer projection 136. For example, the opening 318 may be substantially equal to or greater than the top diameter $d_t$ of the projection 136 in order to fit the washer projection 136 into the opening 318. In an embodiment, a kit of the present invention includes a boring device, such as a forester drill bit, dimensioned to be compatible with the washer dimensions.

Referring additionally to FIGS. 7-10, shown are various views of the washer assembly 106, in accordance with embodiments. The washer assembly 106 includes a compressible gasket 140 (e.g., an O-ring or other elastomer), shown in FIG. 1, configured to mate with a recess, an annular groove or channel 142, formed on the underside surface 138 of the washer 134, as shown in FIG. 8. The gasket 140 may be configured (e.g., sized and shaped) to fit within a depth of the recess or channel 142 using a compression fit connection or the like. In an alternate embodiment, the compressible gasket may be mated with at least a portion of the lower surface of the washer body, without the need for a recess or channel, such as with use of mating friction fit, molding or adhesive. The compressible gasket 140 is further configured to engage with an outer surface of the laminate cover 316 once the washer assembly 106 is coupled to the wall panel 302 and compressed to form a seal, as shown in FIG. 3. In embodiments, the gasket 140 operates to create a secure engagement or seal between the underside surface 138 of the washer assembly 106 and the outer surface of the laminate cover 316. This seal may be substantially waterproof and dustproof, thus further enhancing the suitability of the fastener assembly 100 for highly clean environments.

The washer assembly 106 further includes a thin, compressible washer or disk 144 configured to reside between the washer 134 and the spacer 104. As shown in FIG. 7, a top surface 145 of the washer 134 includes a mating surface, preferably of a flat groove, recess, or channel 146, configured (e.g., sized and shaped) to receive the compressible washer 144 and the spacer 104 therein. The recess or flat groove 146 may have an outer upstanding wall with a height that is selected in order to accommodate the compressible washer 144 as well as a bottom portion of the spacer 104. Placing the spacer 104 into the flat groove 146 of the washer 134 and inserting the compressible washer 144 therebetween can prevent slippage and create a tight, secure seal between the spacer 104 and the washer 134.

In one alternative embodiment, the spacer 104 is fixedly attached to the washer 134, such that the spacer 104 and washer 134 form a single unit. In another alternative embodiment, the fastener assembly 100 does not include the spacer 104. Instead, the strut member 308 is attached directly to the washer assembly 106 using the elongated fastener 102.

In some embodiments, the spacer 104 and/or the washer assembly 106 can be made in various sizes to accommodate different types of installations or use cases. For example, the spacer 104 may be made available in different widths and/or lengths, and the washer 134 may be made available in different diameters.

Figure 14:
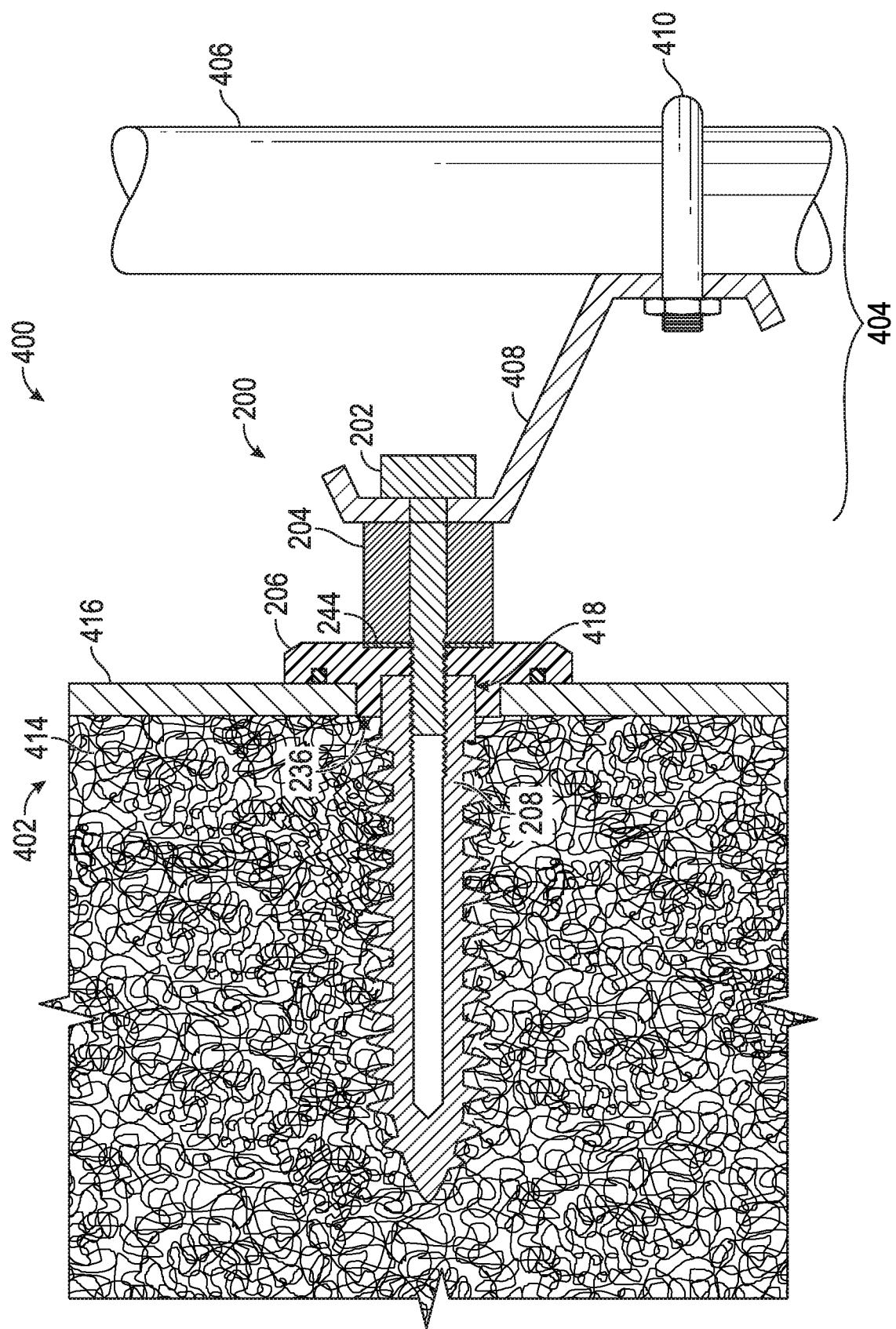
FIG. 14 is a cross-sectional side view of an exemplary wall mounting assembly attached to a wall panel, the wall mounting assembly including the fastener assembly of FIG. 12 and an exemplary mounting bracket or strut assembly, in accordance with certain embodiments.

FIGS. 12-14 illustrate another exemplary fastener assembly 200, in accordance with embodiments. The fastener assembly 200 is at least somewhat similar to the fastener assembly 100 shown in FIG. 1, though not having an upper crown of the anchor and mating projection of the washer assembly. For example, as shown in FIG. 12, the fastener assembly 200 includes an elongated fastener 202, a spacer 204, and a washer assembly 206 comprising a main washer body 234, a compressible gasket 240 for forming a seal with a wall panel, and a thin, compressible washer 244 for coupling between the washer 234 and the spacer 204, all of which is substantially similar to the corresponding components of the fastener assembly 100.

The fastener assembly 200 also includes an anchor 208 with an outer wall 217 having a generally helical arrangement of threads 218 projecting radially outwards along an extent of the wall 217, similar to the anchor 108 shown in FIG. 1. As shown in FIG. 13, the anchor 208 also includes a central passageway 214 comprising a threaded surface 219 for securely receiving the fastener 208 within the anchor 208, the passageway 214 extending between a pointed bottom end 220 of the anchor 208 and an opposing drive head 222, which surrounds an open top end 215 of the anchor 208.

FIG. 14 shows a wall mounting assembly 400 coupled to a wall panel 402, in accordance with embodiments. The wall panel 402 includes a thickness 414 of compressible material (e.g., foam) and a thin laminate cover 416 (e.g., stainless steel cladding). The wall mounting assembly 400 includes the fastener assembly 200 and a strut assembly 404 configured to carry a pipe, conduit, or tube, like the strut assembly 304. The strut assembly 404 is coupled to the wall panel 402 using the fastener assembly 200.

As shown, the anchor 208 is configured for insertion into the compressible material 414 of the wall panel 402. Like the anchor 108, the threaded arrangement 218 of the anchor 208 is configured to engage with and grip the compressible material 414, thus prevent slippage or movement once installed within the wall 402.

The fastener 202 is configured to secure all of the separate components—strut member 408, spacer 204, washer assembly 206, and anchor 208—together and to the wall panel 402, as shown in FIG. 4. In embodiments, an opening or hole 418 is formed in the wall panel 402 to receive the anchor 208 and an extent of the washer 234. The washer 234 includes a projection 236 with an open cavity for receiving an extent of the anchor drive head 222 upon coupling the washer 234 to the wall panel 402, as shown in FIG. 14. The opening 418 may be configured (e.g., sized and shaped) to receive the washer projection 236. A flange portion of the washer 234 engages an outer surface of the wall panel 402 and includes a compressible gasket 240 (e.g., O-ring) for creating a tight seal between the washer 234 and the laminate cover 416. The spacer 204 and a compressible washer 244 are coupled to a flat groove on a top surface of the washer 234, opposite the gasket 240. The spacer 204 is coupled to a strut member 408 using the fastener 202.

Figure 15:
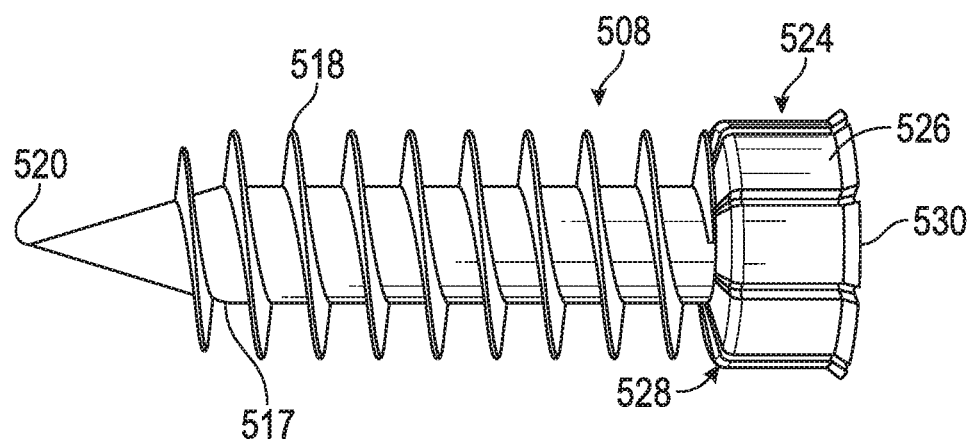
FIG. 15 is a side view of an exemplary wall anchor in according with certain embodiments.
Figure 16:
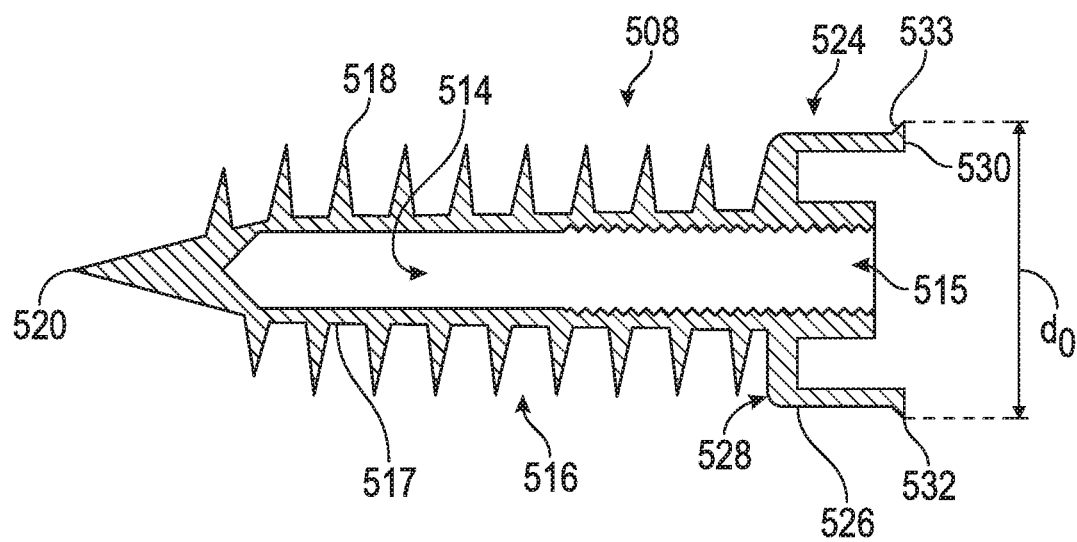
FIG. 16. is a cross-sectional view of the wall anchor shown in FIG. 15, in accordance with embodiments.

FIG. 15 illustrates an exemplary wall anchor 508 in accordance with certain embodiments. FIG. 16 illustrates a cross-sectional view of the wall anchor 508. As shown, the wall anchor 508 is similar to the wall anchor 108 shown in FIGS. 1 and 2. For example, like the wall anchor 108, the wall anchor 508 has an elongated body 516 comprised of an outer wall 517 and helical threads 518 extending radially outward along an extent of the outer wall 517. The anchor 508 further includes a hollow center, or central passageway 514, formed within and extending substantially through an extent of the elongated body 516. The helical threads 518 are formed by wide, substantially flat walls with thin, sharp edges that spiral around the outer wall 517 of the anchor 508 and create a progressive profile starting from the bottom, adjacent a distal end 520 of the wall anchor 508 and ending at the top of the threads. Also like the wall anchor 108, the wall anchor 508 includes an upper crown 524 that has a generally annular shape and is arranged about an open end 515 of the central passageway 514. The upper crown 524 comprises a plurality of circumferentially spaced wall elements 526 that cooperate to form an outer crown diameter $d_o$, the top end of each wall element 526 forming a top rim 530 with a flange portion 532 extending out from the rest of the wall element 526 in a substantially perpendicular direction.

The wall anchor 508 differs from the wall anchor 108 in that (1) the end 520 of the wall anchor 508 has a pilot tip that is more pointed and elongated than the end 120 of the wall anchor 108 shown in FIGS. 1 and 2, and (2) the crown elements 526 of the wall anchor 508 extend upward from a base portion 528 of the crown 524 in a substantially straight manner, unlike the outwardly sloping crown walls 126 of the wall anchor 108 shown in FIGS. 1 and 2.

More specifically, the pilot tip end 520 of the wall anchor 508 preferably has an elongated tapered or conical shape which is longer and more pointed or sharper that other embodiments, dimensioned to provide a pilot end to bore a straight path through compressible material of a support wall (e.g., wall 302 shown in FIG. 3) during installation. For example, a length of the conical end 520 and a slope of the walls that form the conical end 520 may be selected to better facilitate boring or piercing through the compressible material and thereby serve as a pilot to guide straight insertion of the anchor. In one exemplary embodiment, the conical end 520 has a length of about 0.5 to 1 inch (e.g., approximately 0.85 inch), while the remainder of the elongated body 516, or the extent carrying the helical threads 518, has a length of about 1.8 to 2.5 inches (e.g., approximately 2 inches), and the crown 524 has a length of about 0.5 to 0.75 inch (e.g., approximately 0.56 inch).

In some embodiments, a sloping profile of the conical end 520 mates with, or is a continuation of, a sloping profile of the helical threads 518. For example, the sloping profile may be aligned with a progressive width of the threading 518 so the elongated anchor body 516 has an extent that progressively narrows or tapers from top to bottom. In other embodiments, only a lower portion of the thread profile may be tapered to mate with the sloping profile of the conical end 520, for example, as shown in FIGS. 15 and 16. According to embodiments, the progressive profile of the anchor 508, coupled with the overall length of the anchor 508, and the use of a sturdy, lightweight material to manufacture the anchor 508, enables the anchor 508 to be forced into compressible material of a support wall (e.g., wall 302 shown in FIG. 3) with a modest and controlled amount of force, and guided by the pilot tip to pass generally straight along a generally linear path, thus avoiding excessive tearing of the compressible material or wandering off the intended path of insertion.

FIGS. 15 and 16 also show an embodiment of the upper crown whereby the crown elements 526 have substantially straight or upright walls, except for the flange or protruding lip 532 of the terminal end, i.e., the top rim 530. The top rim 530 extends out from the rest of the crown element 526 in a substantially perpendicular direction. The flange portion 532 is formed by a sidewall 533 that slopes outwards, or extends radially, from the crown element 526, and ends at the top rim 530. The upper crown 524 may otherwise operate in a substantially similar manner as the crown 124 described above and shown in FIGS. 1 and 2. For example, as shown in FIG. 16, the top rim 530 of the crown elements 526 may have an outer diameter $d_o$ formed by the outer edges of the flange portions 532. An opening in a support wall (e.g., opening 318 shown in FIG. 3) may have a diameter that is smaller than at least the outer diameter $d_o$. Thus, as the crown 524 passes through the wall opening, at least a portion of each crown element 526, including the sloped sidewall 533, may be compressed inwards until the top rim 530 clears the wall opening. Further, the crown elements 526 may be expanded or pressed outwards upon insertion of a washer (e.g., washer 134 shown in FIG. 1) into the crown 524, as described above.

Figure 17:
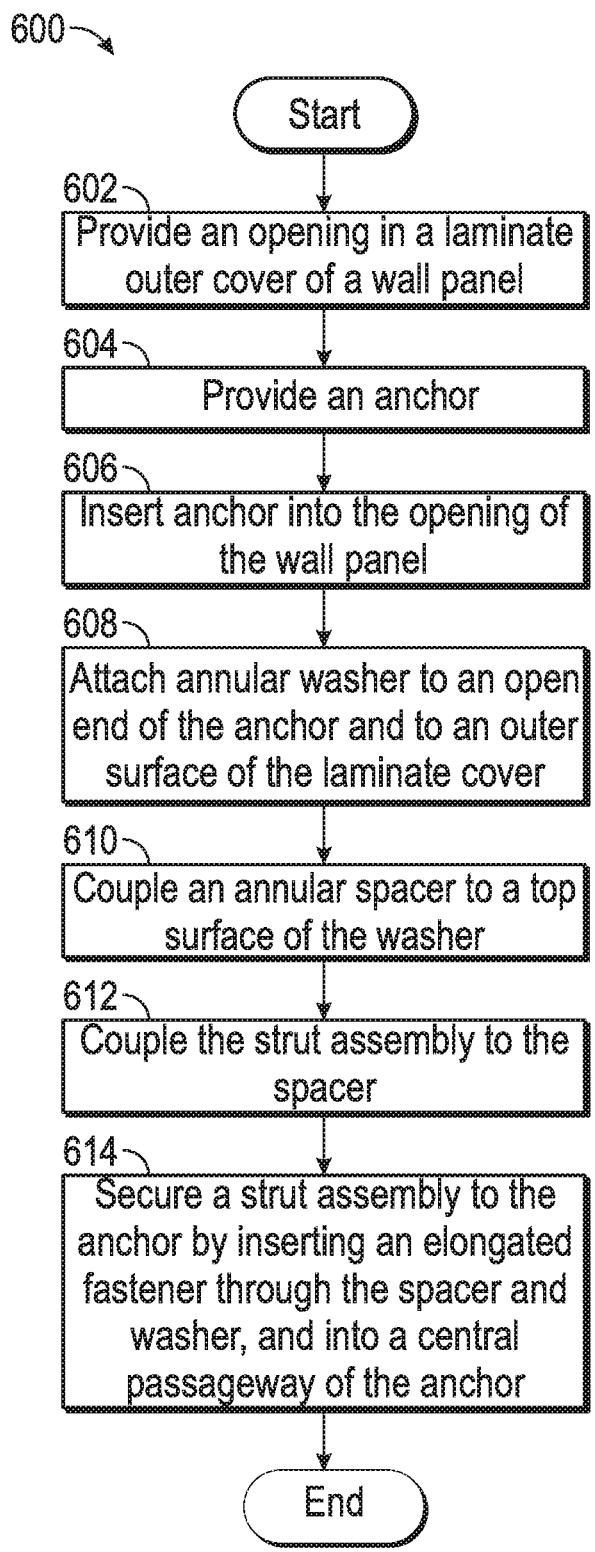
FIG. 17 is flow diagram for an exemplary method of mounting a supported element to a wall structure, in accordance with certain embodiments.

FIG. 17 illustrates an exemplary method 600 of mounting a supported element to a wall structure having a laminate outer cover and thickness comprised of compressible material, in accordance with embodiments. As an example, the method 600 may be used to mount a strut assembly coupled to a pipe, conduit, or tube (e.g., strut assembly 304 shown in FIG. 3) to a laminate foam wall panel (e.g., wall panel 302 shown in FIG. 3) using a fastener assembly (e.g., fastener assembly 100 shown in FIG. 1).

As shown, the method 600 may begin at step 602 with providing an opening (e.g., opening 318 shown in FIG. 3) in a laminate outer cover of the wall structure, the opening having a characteristic diameter. The characteristic diameter may be selected based on one or more attributes of the fastener assembly, such as, for example, a diameter associated with a washer projection (e.g., projection 136 shown in FIG. 7) and/or a diameter associated with an anchor crown (e.g., crown 124 shown in FIG. 1). Thus, in some embodiments, the step of providing an opening in the laminate cover includes forming a hole in the laminate cover sized to receive at least one of the mating portion (e.g., crown 124) of the anchor or the washer projection. The opening may be pre-drilled or may be created during installation of the mounting assembly.

At step 604, an anchor (e.g., anchor 108 shown in FIG. 1) having a generally cylindrical elongated body with a central passageway (e.g., passageway 114 shown in FIG. 2) and an open end (e.g., open end 115 shown in FIG. 2) is provided. The anchor body (e.g., elongated body 116) has a sidewall (e.g., outer wall 117 shown in FIG. 1) with a generally helical arrangement (e.g., threads 118 shown in FIG. 1) projecting radially outward along an extent of the sidewall. In embodiments, the generally helical arrangement of radially outward projections forms an outer threading (e.g., as shown in FIG. 1) for gripping or engaging with the compressible material of the wall panel.

At step 606, the anchor is inserted into the opening of the laminate cover to secure the anchor to the wall structure. This step can include threading the anchor into the wall structure by turning the anchor body to force an extent of the anchor body into compressible material of the wall structure. In some embodiments, the anchor includes an upper crown (e.g., crown 124 shown in FIG. 2) arranged about the open end of the central passageway and comprising a plurality of circumferentially spaced elements (e.g., crown elements 126 shown in FIG. 1) cooperating to form an outer crown diameter (e.g., diameter $d_o$ shown in FIG. 2). In such cases, the step of inserting said anchor into the wall structure includes causing the crown elements to deform radially inward and reduce the outer crown diameter (e.g., to the contracted diameter $d_3$ shown in FIG. 6) as the upper crown passes through the opening, and spring back to the outer diameter once the upper crown clears the opening. Once inside the wall panel, a top rim (e.g., top rim 130) of the anchor crown is positioned against an underside of the laminate cover.

At step 608, an annular washer (e.g., washer assembly 106 shown in FIG. 1) is attached to the open end of the anchor and against an outer surface of the laminate cover of the wall structure. In embodiments, attaching the annular washer includes inserting a projection (e.g., washer projection 136 shown in FIG. 7) depending from the washer into a mating portion of the anchor. The mating portion of the anchor can include the upper crown (e.g., crown 124 shown in FIG. 2). Attaching the washer can further include the steps of engaging said washer projection with said crown elements, and forcing the projection against the crown elements to enlarge the outer crown diameter (e.g., expanded diameter $d_2$ shown in FIG. 5). According to some embodiments, the step of forcing the projection against the crown elements can include causing an extent of the upper crown to move radially outward and into a position adjacent to an underside of the laminate cover of the wall structure (e.g., as shown in FIG. 3). For example, the crown elements may be pushed into an expanded position by the washer projection, such that the crown elements are arranged around or outside a perimeter of the opening.

At step 610, after at least partially securing the anchor to the wall structure, an annular spacer (e.g., spacer 104 shown in FIG. 1) is coupled to a top surface of the washer (e.g., top surface 145 shown in FIG. 11). For example, the spacer may be inserted into a flat groove (e.g., groove 146 shown in FIG. 11) on the top surface of the washer, the groove being configured to receive an extent of the spacer. In some embodiments, coupling the spacer also includes placing a thin, compressible washer (e.g., thin washer 144 shown in FIG. 11) into the flat groove before attaching the spacer, in order to more securely engage the spacer to the washer.

At step 612, a strut assembly (e.g., strut assembly 304 shown in FIG. 3) is coupled to the spacer, or placed against the spacer, opposite the washer assembly. At step 614, the strut assembly is secured to the anchor by inserting an elongated fastener into said passageway of the anchor to mechanically secure the strut assembly into place adjacent the wall structure. In embodiments, securing said strut assembly includes inserting the elongated fastener through the spacer and the washer and securely fastening a threaded arrangement of the fastener within the central passageway of the anchor to mechanically secure the spacer, washer, and anchor together as an assembly. The method 600 may end once the strut assembly is secured to the wall panel.

Figure 18:
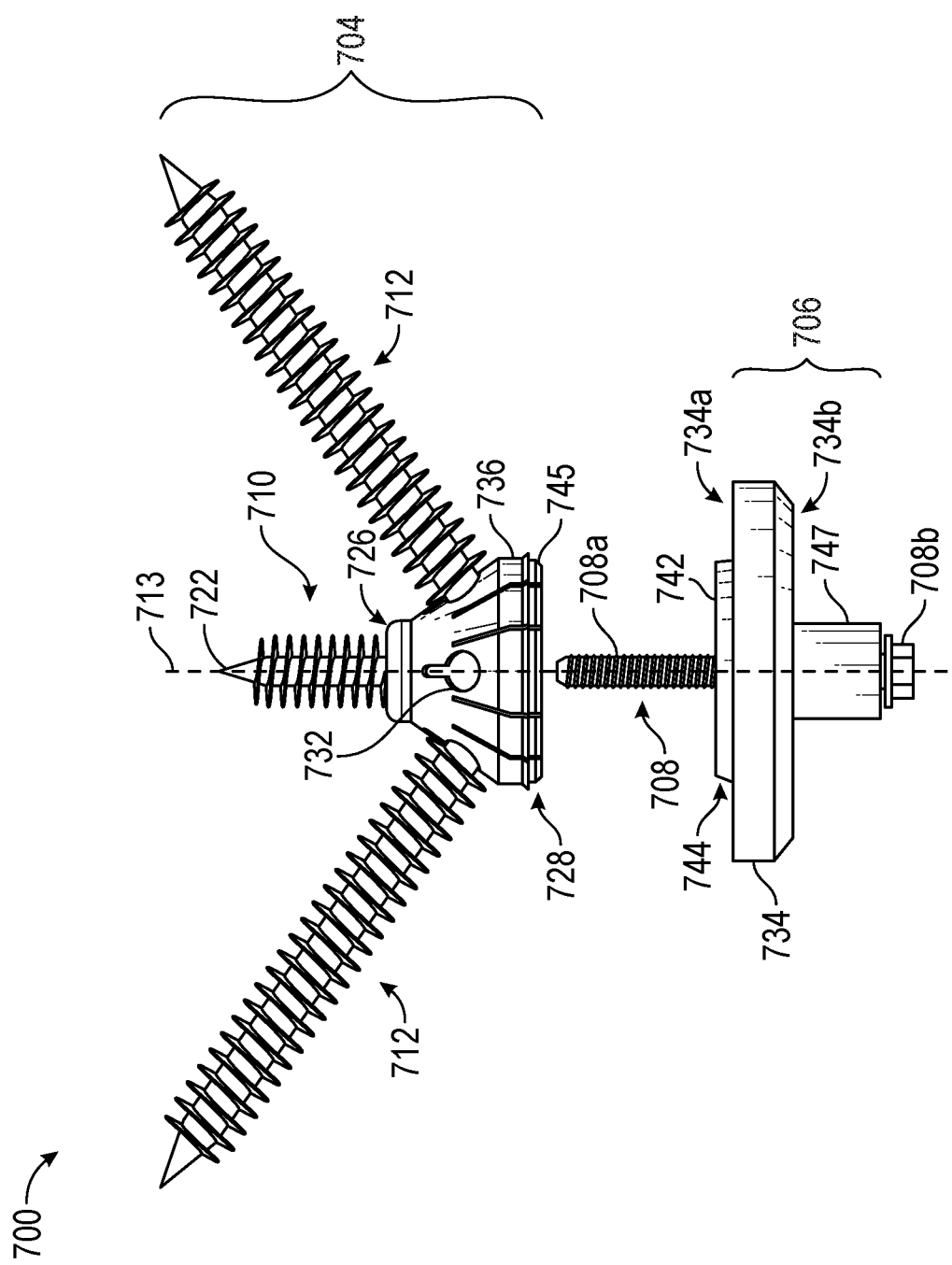
FIG. 18 is a side view of another exemplary fastener assembly, in accordance with certain embodiments.

FIGS. 18 and 19 illustrate another exemplary fastener assembly 700 (also referred to herein as a "mounting assembly") for securing a supported element (not shown) to a wall structure 702 (also referred to herein as a "wall panel"), in accordance with embodiments. In certain embodiments, the fastener assembly 700 may be configured for optimally handling direct tension applications, such as, e.g., a supported element hanging from a ceiling or other horizontal surface, while the fastener assembly 100 shown in FIG. 1 may be configured to optimally withstand shear loads, such as, e.g., a supported element mounted to a vertical or upright wall. Accordingly, FIG. 19A shows the wall structure 702 as part of a ceiling or other horizontal support structure. In other embodiments, the wall structure 702 may be situated vertically to form part of a wall or other vertical support structure, for example, like the wall panel 302 shown in FIG. 3.

The wall structure 702 is comprised of a thick, inner portion 714 (also referred to herein as an "internal thickness") constructed of thick foam or foam board, or other sturdy, compressible material, similar to the wall panel 302 shown in FIG. 3. The inner portion 714 is overlaid by a thin panel 716 (also referred to herein as an "outer wall panel"), such as a laminate cover or sheet metal cladding made of stainless steel, similar to the thin panel 316 shown in FIG. 3. As an example, the thin panel 716 may be configured to face an interior of the food preparation area or other location in which the fastener assembly 700 is installed. The thickness of the wall structure 702 may be, for example, four to eight inches, while the thin panel 716 may be significantly thinner (e.g., like a skin). As an example, the wall structure 702 may be an insulated wall panel sold by Kingspan®, such as the Mineral Fiber (MF) Fire Rated wall panel.

In embodiments, the fastener assembly 700 is specifically configured to handle direct tension loads without causing the ceiling panel/wall structure 702 to buckle or sag from the load. Moreover, the fastener assembly 700 is configured to handle such loads without penetrating all the way through the wall panel 702 and attaching on a backside of the panel 702, like some existing fasteners. Instead, the fastener assembly 700 includes an internal assembly 704 configured to engage the internal thickness 714 of the wall structure 702 and reside substantially within the internal thickness 714, as well as an external assembly 706 configured to engage the wall panel 716 and a portion of the internal assembly 704, while residing substantially outside the wall structure 702. The fastener assembly 700 also includes an elongated fastener 708 configured to secure the external assembly 706 to the internal assembly 704 by extending through an open center of the external assembly 706 and into an internal passageway of the internal assembly 704. In embodiments, the internal assembly 704 is configured to provide good tensile strength against the wall structure 702, while the external assembly 706 is configured to provide good shear strength against the wall structure 702. This combination enables the fastener assembly 700, as a whole, to remain securely coupled to a ceiling panel while carrying direct tension loads.

The elongated fastener 708 may be substantially similar to the elongated fastener 102 shown in FIG. 1 and described herein. For example, in a preferred embodiment, the elongated fastener 708 can be a Type 304 Stainless Steel Hex Bolt, or Hex Head Cap Screw, with a ⅜ inch diameter a body length of at least 2 inches and right hand national coarse threads (e.g., 16TPI), similar to the illustrated fastener 102. As will be appreciated, the exact size or dimensions of the fastener 102 can be selected based on certain dimensions of the external assembly 706 and the internal assembly 704.

In embodiments, to install the fastener assembly 700 in the wall structure 702, an opening or hole 717 may be formed through the wall panel 702 first. The hole 717 may be created, for example, by first piercing the thin panel 716 from an outer side 715 of the panel 716, and then boring or drilling through the internal thickness 714 to remove a small portion of the compressible material therein. In certain embodiments, a size or diameter of the hole 717 may be selected based on sizes of one or more components of the fastener assembly 700, as described herein. In one example embodiment, the hole 717 has a diameter between 2 and 3 inches, preferably 2.5 inches to match a standard hole saw size.

Figure 20:
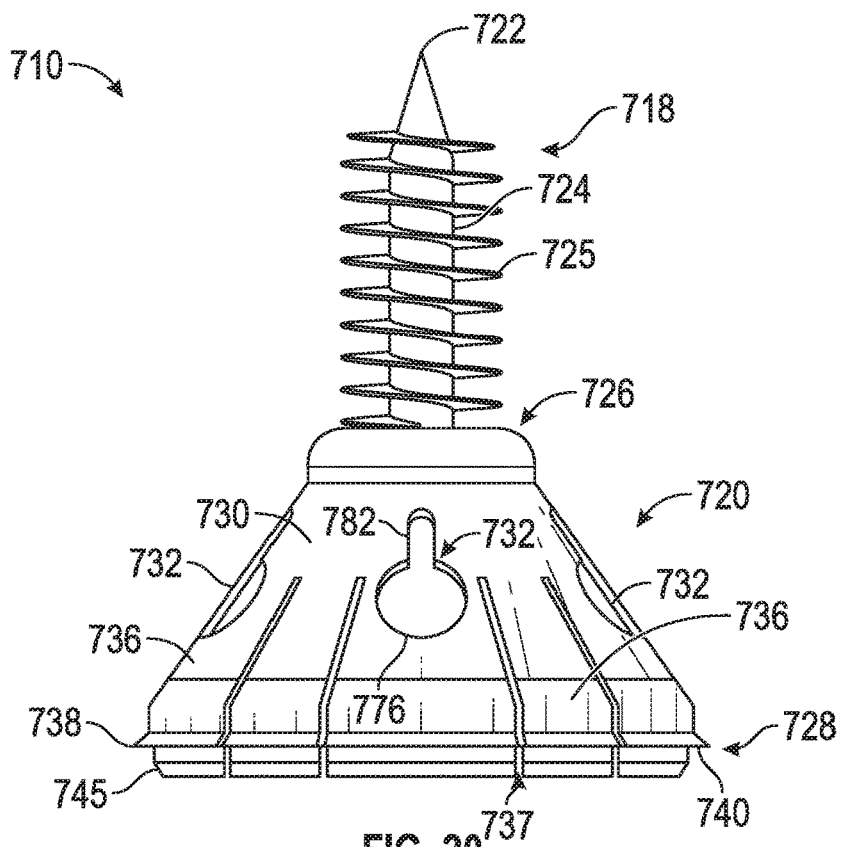
FIG. 20 is a side view of an exemplary central anchor assembly included in the fastener assembly of FIG. 18, in accordance with certain embodiments.
Figure 21:
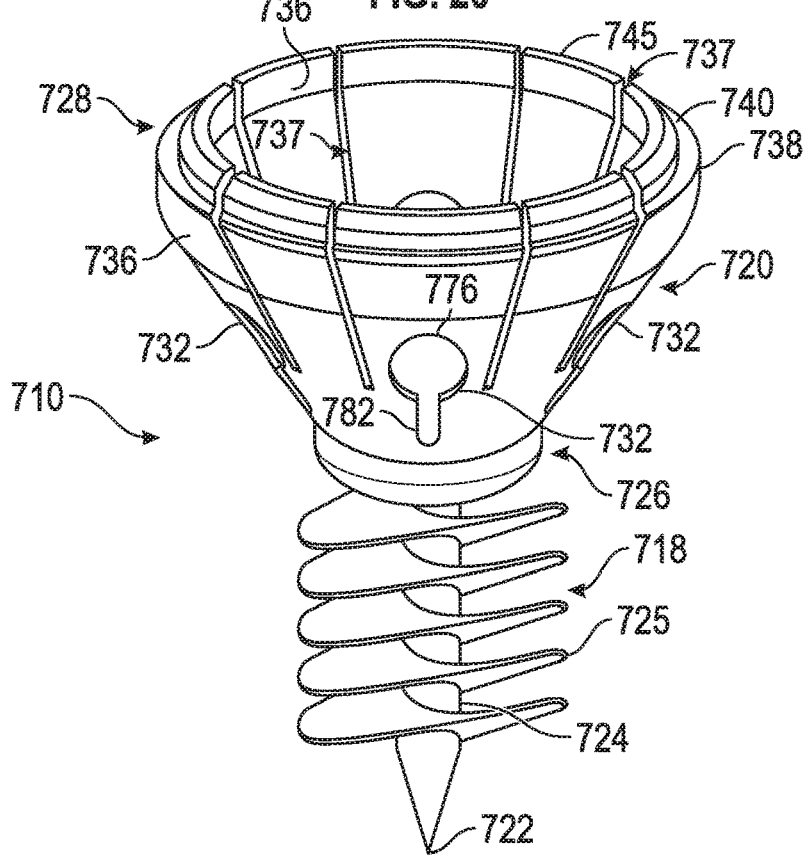
FIG. 21 is a perspective view of the central anchor assembly of FIG. 20, in accordance with certain embodiments.
Figure 22:
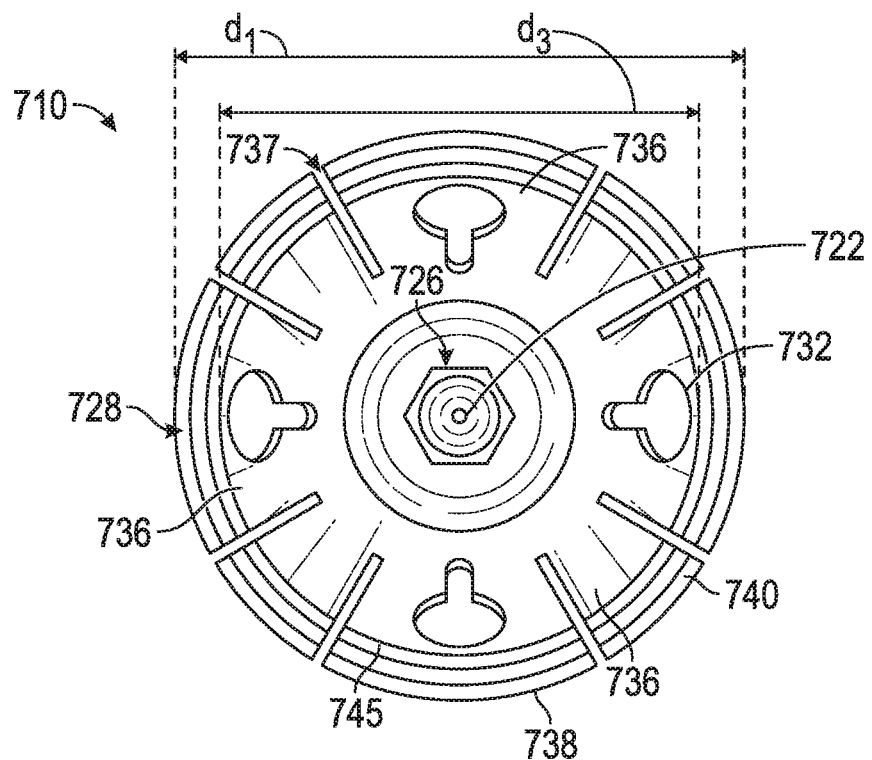
FIG. 22 is a top view of the central anchor assembly of FIG. 20, in accordance with certain embodiments.

Referring additionally to FIGS. 20 through 22, in embodiments, the internal assembly 704 comprises a central anchor assembly 710 (or "main anchor body") with an anchor portion 718 that is configured for insertion into the internal thickness 714 of the wall structure 702. The central anchor assembly 710 further comprises a mating portion 720 that is annularly arranged at or about an open end of the anchor portion 718 and configured to engage the thin wall panel 716 adjacent the hole 717 upon coupling the central anchor assembly to the wall structure 702.

The internal assembly 704 further comprises a plurality of elongated anchors 712 (also referred to as "lateral anchors") configured for attachment to the mating portion 720 at an oblique angle relative to a central axis 713 of the central anchor assembly 710, and for insertion into the internal thickness 714. The lateral anchors 712 can be driven into the wall structure 702 in multiple different angular directions, as shown in FIG. 18. The angular directions can be selected to evenly distribute any tension loads experienced by the fastener assembly 700 amongst the multiple lateral anchors 712, thus firmly securing the central anchor assembly 710 within the wall structure 702.

In embodiments, a length of each of the lateral anchors 712 may be selected based on a thickness or depth of the wall structure 702, which can vary depending on the application (e.g., 3 in., 4 in., 5 in., 6 in., etc.). The length of the lateral anchor 712 can affect the load carrying capability of the lateral anchor 712. Accordingly, in some cases, the length may be selected so that the lateral anchors 712 can angularly extend as far as possible into the internal thickness 714, for example, without penetrating an opposite or back side of the wall structure 702 (i.e. opposite the thin wall panel 716). In one example embodiment, each lateral anchor 712 is about 9 to 10 inches long.

The central anchor assembly 710 may be comprised of food grade plastic, such as, e.g., delrin, or any other suitable material. In some embodiments, the central anchor assembly 710 is constructed as a single or unitary piece, for example, using injection molding or other appropriate manufacturing technique, to provide increased structural integrity. In other embodiments, the anchor portion 718 and the mating portion 720 may be constructed as two separate pieces and may be permanently attached or coupled together to form the central anchor assembly 710. In either case, the mating portion 720 is fixedly attached to the anchor portion 718 adjacent the open end of the anchor portion 718.

In embodiments, the anchor portion 718, by itself, may be substantially similar to the anchor 208 shown in FIG. 13, except that it is coupled to the mating portion 720. For example, like the anchor 208, the anchor portion 718 comprises an open end similar to the open end 215 shown in FIG. 13. In addition, the anchor 718 comprises a closed end 722 disposed opposite the open end and an internal passageway or shaft 723 extending between the two ends. The internal passageway 723 can be configured to receive the elongated fastener 708, for example, by including a threaded surface that is similar to the threaded surface 219 shown in FIG. 13, or otherwise configured to mate with, or be secured to, a threaded portion 708a of the elongated fastener 708. Also like the anchor 208, the anchor portion 718 may further comprise an outer wall 724 with a generally helical arrangement of one or more threads 725 projecting radially outwards along an extent of the outer wall 724 (also referred to herein as a "threaded outer wall"). This threaded arrangement 725 can be configured to cut into the internal thickness 714 during insertion, and once installed, grip the internal thickness 714 to prevent slippage or movement of the anchor portion 718, thereby securing the anchor portion 718 in place. Also, the closed end 722 of the anchor portion 718 may include an elongated, pointed tip (e.g., pilot tip) configured to bore a straight path through the compressible material 714 of the wall structure 702 during installation, similar to the end 520 of the wall anchor 508 shown in FIG. 16, for example.

As shown in FIG. 20, the mating portion 720 of the anchor portion 710 comprises a narrow first end 726 fixedly attached to the anchor portion 718 and a wide second end 728 disposed opposite the first end 726. The mating portion 720 further comprises a sloped wall 730 configured to extend, or slope substantially outwards, from the narrow first end 726 to the wider second end 728, so as to form a frustum. As shown in FIG. 21, the area under the sloped wall 730 may be substantially hollow or open, like a cone or funnel.

As shown in FIG. 18, the sloped wall 730 comprises a plurality of apertures or openings 732 configured to receive respective lateral anchors 712 inserted into the mating portion 720 from the bottom end 728. The apertures 732 may be disposed at equidistant intervals around the mating portion 720, so that each lateral anchor 712 extends out from the mating portion 720 (and into the internal thickness) in a different direction, as shown in FIG. 19A. For example, in FIG. 22, the apertures 732 are disposed at 90 degree intervals from a center of the mating portion 720, such that each aperture 732 is positioned opposite another aperture 732 (i.e. opposing apertures 732 are substantially aligned). As a result, in the illustrated embodiment, the lateral anchors 712 are driven into the wall structure 702 in four different angular directions.

In embodiments, a location of the apertures 732 along the sloped wall 730, as well as the slope or grade of the wall 730, may determine the oblique angle at which each lateral anchor 712 extends out from the mating portion 720. For example, because the sloped wall 730 is configured to slope down and out, or away, from the anchor portion 718 (or as a frustum), coupling the lateral anchors 712 to the apertures 732 from inside the mating portion 720 naturally directs the lateral anchors 712 up and out, or away, from the mating portion 720. In one embodiment, each lateral anchor 712 may extend out from the corresponding aperture 732 at an angle that is substantially perpendicular to the sloped wall 730. In some cases, an exact slope or grade of the sloped wall 730 and a diameter of the bottom end 728 may be selected to provide enough open space inside the mating portion 720 for a user to maneuver the elongated anchors 712 while attaching them to the apertures 732, for example, as shown in FIGS. 27-30. In some cases, the slope or grade of the sloped wall 730 is additionally or alternatively selected in order to achieve a selected oblique angle for driving each of the lateral anchors 712 into the internal thickness 714, the oblique angle being selected so that the fastener assembly 700 optimally withstands tension loads.

Though the illustrated embodiment shows four apertures 732, it should be appreciated that the exact number of apertures 732 may vary depending on the number of elongated anchors 712 used to secure the central anchor assembly 710 to the wall structure 702, or vice versa. For ease of illustration, FIGS. 18 and 19A show only two elongated anchors 712 coupled to the central anchor assembly 710. However, it should be appreciated that up to four elongated anchors 712 may be used, given the four apertures 732 shown in FIG. 22, for example. In other embodiments, the mating portion 720 may include more or fewer apertures 732 in order to receive more or fewer elongated anchors 712. For example, in one embodiment, the internal assembly 704 may include three elongated anchors 712, and the mating portion 720 may include three apertures 732 distributed at equal intervals around the sloped wall 730 (e.g., at about 33.333 degree intervals relative to the center of the mating portion 720).

As shown in FIG. 19A, the second end 728 of the mating portion 720 can be configured to engage an inner surface 733 of the thin wall panel 716, once the central anchor assembly 710 is coupled to the wall structure 702. This engagement can be configured to provide good shear strength to the fastener assembly 700, or otherwise help support shear loads, similar to the engagement between the washer assembly 106 and the anchor 108 shown in FIG. 3. For example, the mating portion 720 of the internal assembly 704 and a washer assembly 734 of the external assembly 706 may be configured to pinch the thin outer panel 716 between them in order to counter any shear stresses, as needed. To create this engagement, an extent or length of the mating portion 720 may be compressed against the inner surface 733 of the thin wall panel 716, such that an overall body length of the central anchor assembly 710 is reduced. The illustrated embodiment (e.g., as shown in FIG. 19A) uses a castellated end or crown to create this compressive contact with, or press down on, the thin wall panel 716. Other techniques or configurations are also contemplated, such as, for example, placing a gasket or other compressible material or device at the second end 728 of the mating portion 720. In some embodiments, the coupling of the mating portion 720 and the washer assembly 734 is configured to, not only exert a downward force on the thin wall panel 716, but also exert a radially outward force against the thin outer panel 716, or more specifically, along the sides of the panel 716 that define the hole 717, as described herein.

In embodiments, to create a castellated end, the sloped wall 730 of the mating portion 720 comprises a plurality of individually movable elements 736 cooperating to form the second end 728 of the mating portion 720 and configured to move relative to the first end 726 of the mating portion 720. In particular, each element 736 can be configured to move inwards and/or outwards during engagement of the mating portion 720 to the outer wall panel 716, as well as engagement of the external assembly 706 with the mating portion 720. As shown in FIG. 20, the individually moveable elements 736 form a first or lower extent of the sloped wall 730 and extend from a remainder or upper extent of the sloped wall 730 that is adjacent the first end 726. As also shown, adjoining moveable elements 736 extend parallel to each other and are separated by a narrow slit 737 that starts at the upper extent of the sloped wall 730, like the elements 736. That is, the moveable elements 736 are connected to the upper extent of the sloped wall 730 but not to each other. This enables the elements 736 to move independently of each other and relative to the upper extent of the sloped wall 730, which remains substantially static during said movement.

In embodiments, the overall movement and/or arrangement of the movable elements 736 may be substantially similar to that of the circumferentially spaced elements or fingers 126 of the upper crown 124 shown in FIG. 1. For example, the individually moveable elements 736 may be configured or arranged to provide the mating portion 720 with a generally castellated shape, like the upper crown 134. In addition, a bottom end of each moveable element 736 may include a flange or protruding lip that extends radially outward from the element 736 to form a rim 738 around the second end 728 of the mating portion 720, for example, similar to the rim 130 shown in FIG. 2. Also like the crown 124 of the fastener assembly 100, the moveable elements 736 of the mating portion 720 may be configured to move when a force is exerted on the mating portion 720 during installation of the fastener assembly 700, for example, as described herein with respect to FIGS. 4 through 6.

More specifically, such forces may include compressive forces applied to the mating portion 720 as the central anchor assembly 710 is inserted into the wall panel 702. For example, the central anchor assembly 710 may be inserted into a hole 717 formed in the outer wall panel 716 with a hole diameter that is smaller than an outer diameter, $d_1$, of the second end 728 of the mating portion 720, or the diameter formed by the rim 738 as shown in FIG. 22, when the mating portion 720 is in a rest position. In such cases, the moveable elements 736 may be at least slightly pushed inwards, or radially inwards, to a contracted position having a reduced diameter (e.g., similar to FIG. 6) and may remain compressed until the second end 728 clears the thin wall panel 716 or passes through the hole 717 and into the internal thickness 716. Once inside the hole 717, the moveable elements 736 may at least partially expand or spring back, for example, to the rest position (e.g., similar to FIG. 4), and a flat surface 740 of the rim 738 may press against, or rest on, the inner surface 733 of the thin wall panel 716, as shown in FIG. 19B.

The moveable elements 736 may also expand to a larger diameter that is greater than the original outer diameter, $d_1$, of the second end 728 in response to expansive forces applied to the mating portion 720 during attachment of the external assembly 706 to the internal assembly 704. For example, similar to the washer assembly 106 shown in FIG. 1, the washer assembly 734 includes a projection 742 that is configured to engage the second end 728 of the mating portion 720 but has an outer diameter, $d_2$, that is at least slightly larger than an inner diameter, $d_3$, of the second end 728. As a result, the projection 742 presses or forces the moveable elements 736 radially outwards as the projection 742 is inserted into the second end 728 of the mating portion 720. The force exerted by the projection 742 causes the moveable elements 736 to move to an expanded position and thereby increases the diameter of the second end 728 of the mating portion 720 to an enlarged diameter (e.g., similar to FIG. 5).

The expanded position of the mating portion 720 may cause the overall body length of the central anchor assembly 710 to be at least slightly reduced or compressed, due to the moveable elements 736 now being forced outwards or to the side to accommodate the projection 742. At the same time, forcing the mating portion 720 outwards may cause each moveable element 736 to press back against the projection 742 with a substantially equal and opposite force. Together, these forces may cause the moveable elements 736 to behalf like a castellated ferrule, or otherwise grasp or clamp onto the projection 742, thus securing the washer assembly 734, and the rest of the external assembly 706, to the central anchor assembly 710.

Figure 23:
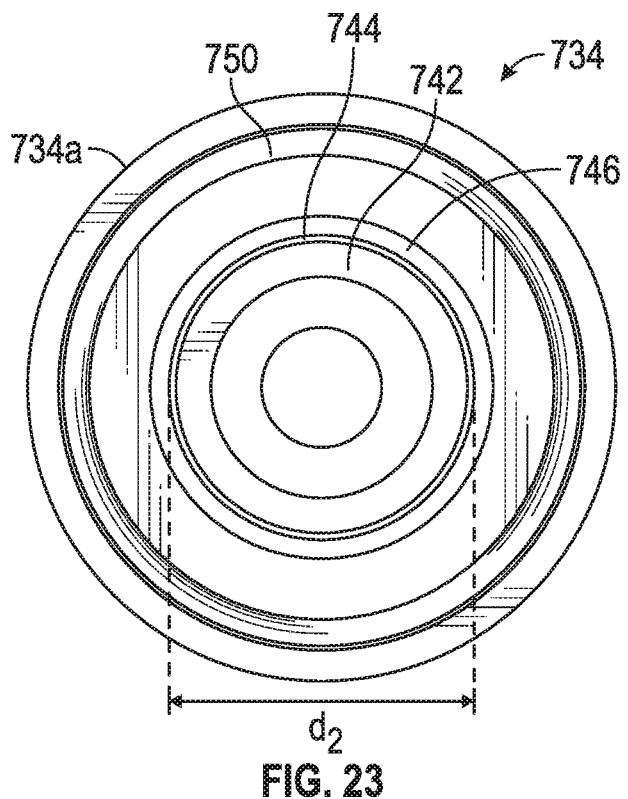
FIG. 23 is a top view of an exemplary washer included in the fastener assembly of FIG. 18, in accordance with certain embodiments.

Referring additionally to FIG. 23, in some embodiments, the projection 742 of the washer assembly 734 may have a beveled surface 744, or an inwardly sloping wall, that is configured to help ease the projection 742 into the second end 728 of the mating portion 720, as described herein with respect to the beveled projection 136. For example, the beveled surface 744 may have a first or inner diameter that is less than the inner diameter, $d_3$, of the second end 728 of the mating portion 720 and a second or outer diameter that is greater than the inner diameter, $d_3$.

In some embodiments, the mating portion 720 further comprises a protrusion 745 (also referred to herein as a "shoulder") configured to extend down or out from the second end 728 of the mating portion 720, opposite the pointed end 722 of the anchor portion 718. The protrusion 745 is further configured to engage the projection 742 of the washer assembly 734 upon coupling the external assembly 706 to the internal assembly 704. For example, as shown in FIG. 19B, the protrusion 745 can have a length that is configured to extend out from the hole 717 (or past the outer surface 715 of the thin wall panel 716), once the central anchor assembly 710 is coupled within the wall structure 702. This length of the protrusion 745 engages a narrow annular groove 746 included on a first side 734a of the washer assembly 734 adjacent the projection 742 once the washer assembly 734 is coupled to the mating portion 720. As shown in FIG. 19A, the narrow groove 746 is disposed around a base of the projection 742, and the protrusion 745 extends or hangs down from the flat surface 740 of the rim 738.

In embodiments, the protrusion 745 may define the inner diameter, $d_3$, of the second end 728, as shown in FIG. 22, and said inner diameter, $d_3$, may be at least slightly smaller than the outer diameter, $d_2$, of the projection 742. As a result, the projection 742 may force the moveable elements 736 at least slightly outwards as the protrusion 745 slides into the groove 746 against the projection 742. This connection creates a tight fit (e.g., press-fit) between the protrusion 745 and the projection 742 and causes the mating portion 720 to press radially outwards against the thin wall panel 716, or more specifically, the sides of the panel 716 that define the hole 717. As a result, the mating portion 710 engages the thin wall panel 716 in two directions: a downward force exerted by the moveable elements 736 that form the castellated second or bottom end 728 and a radially outward force (e.g., relative to a center of the hole 717) exerted by the protrusion 745 of the bottom end 728.

In embodiments, to ensure the above-described engagement, the outer diameter, $d_1$, of the second end 728 of the mating portion 720 may be selected based on the outer diameter, $d_2$, of the washer projection 742, or vice versa, for example, as described herein with respect to the washer assembly 106. In some embodiments, the diameter of the hole 717 formed into the wall structure 702 may be selected based on the outer diameter, $d_2$, of the washer projection 742 and/or the outer diameter, $d_1$, of the mating portion 720, as also described herein. For the sake of brevity, further details about the projection 742 and its engagement with the washer assembly 734 are not provided here, to the extent that they are substantially similar to the above description of the anchor crown 124 and its engagement with the washer assembly 106, particularly with respect to FIGS. 4 through 6.

As shown in FIG. 18, in addition to the washer assembly 734 (also referred to herein as a "washer"), the external assembly 706 further comprises a spacer 747, similar to the spacer 104 shown in FIG. 11. For example, like the spacer 104, the spacer 747 is configured to cover an exposed portion of the fastener 708 to avoid the collection of debris and other contaminants on the fastener 708. The external assembly 706 may also comprise a thin compressible washer or disk 748 that is similar to the disk 144 also shown in FIG. 11. In some embodiments, the spacer 747 and/or the disk 748 may be integral to the washer assembly 734, such that the external assembly 706 is provided as a single, unitary piece. In other embodiments, the external assembly 706 may include only the washer assembly 734 and no spacer or disk. In one embodiment, the external assembly 706 also includes a thin, flat washer (not shown) that is coupled to the elongated fastener 708 between the spacer 747 and the fastener head 708b. The flat washer has no threads and may be configured to evenly distribute the load of the elongated fastener 708 as the fastener assembly 700 is secured into place on the wall structure 702.

As shown in FIG. 19A, the projection 742 is located on the first side 734a of the washer assembly 734, and the spacer 747 and disk 748 are coupled to an opposing second side 734b of the washer assembly 734. In some embodiments, the washer assembly 734 includes a recess or flat groove on the second side 734b that is configured to receive the disk 748 and in some cases, a bottom portion of the spacer 747, similar to groove 146 shown in FIG. 11. Each of the spacer 747, the washer assembly 734, and the disk 748 (or each component of the external assembly 706) is generally annular in shape and is centrally aligned with the central axis 713, so that the external assembly 706, as a whole, has an open center for receiving the elongated fastener 708 therethrough (e.g., similar to the fastener assembly 100 of FIG. 1).

As shown in FIG. 23, the washer assembly 734 further comprises a compressible gasket 750 (e.g., an O-ring or other elastomer) that is similar to the gasket 140 shown in FIG. 10. For example, like the gasket 140, the gasket 750 operates to create a secure engagement or seal between the outer side 715 of the thin wall panel 716 and the first side 734a of the washer assembly 734, upon installation. As shown in FIG. 19B, the gasket 750 is configured to mate with an annular groove or channel 752 formed on the first side 734a of the washer assembly 734, similar to the channel 142 shown in FIG. 8.

Figure 24:
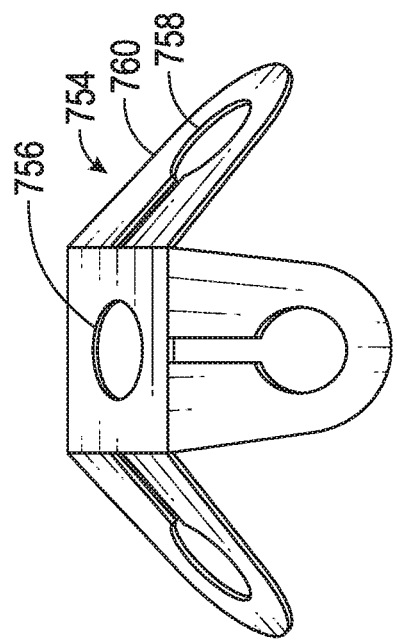
FIG. 24 is a top view of an exemplary bracket included in the fastener assembly of FIG. 18, in accordance with certain embodiments.
Figure 25:
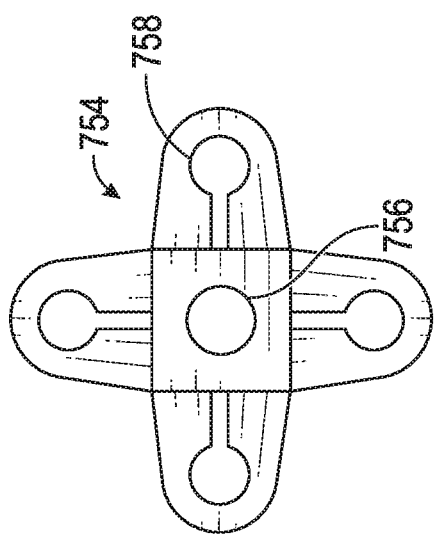
FIG. 25 is a perspective view of the bracket of FIG. 24, in accordance with certain embodiments.

Referring additionally to FIGS. 24 and 25, shown is an exemplary bracket 754 (also referred to herein as a "reinforcement element") that can be coupled to an underside of the mating portion 720, in accordance with embodiments. The bracket 754 may be configured to strengthen a structural integrity of the mating portion 720 by bracing or reinforcing the sloped wall 730 of the mating portion 720. As an example, the bracket 754 may be made of metal (e.g., stainless steel) or any other suitable material. In the illustrated embodiment, the bracket 754 is shown as a separate component that may be coupled to the mating portion 720 during installation of the fastener assembly 700, for example, after inserting the central anchor assembly 710 into the internal thickness 714 but before attaching the elongated anchors 712 to the mating portion 720. In other embodiments, the brackets 754 may be fixedly attached to the mating portion 720 during manufacturing and/or prior to installation.

As shown, the bracket 754 includes a central hole 756 configured to align with the open center of the mating portion 720 and allow the elongated fastener 708 to pass through. The bracket 754 also includes a plurality of apertures 758 disposed radially around the central hole 756 at equal intervals. The apertures 758 can be configured to align with the plurality of apertures 732 included in the mating portion 720 in order to allow the elongated anchors 712 to pass through. As shown, in order to ensure said alignment, the bracket 754 comprises a plurality of angled walls 760 configured to prop up the bracket 754 (e.g., like a spider) and substantially match an angle or slope of the sloped wall 730 of the mating portion 720. Moreover, each angled wall 760 comprises a respective one of the angled apertures 758. As an example, each angled wall 760 may be disposed at an angle of about 50 to 60 degrees relative to a central vertical axis of the bracket 754, and may be positioned at 90 degrees intervals relative to a center of the hole 756. While the illustrated embodiment shows four angled walls 760, the exact number of sloped walls 760 may vary depending on the number of apertures 732 included in the mating portion 720.

Figure 26:
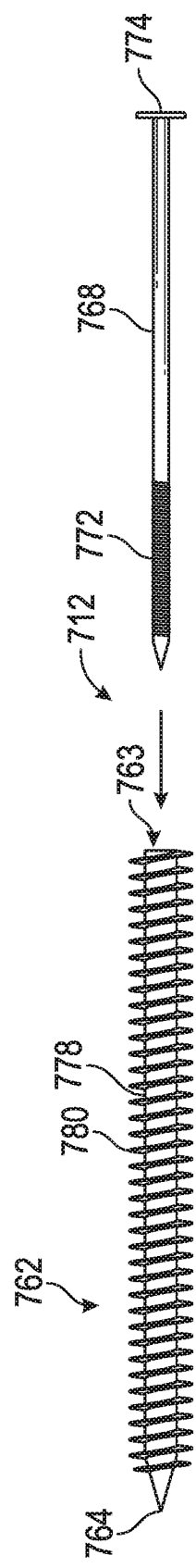
FIG. 26 is an exploded, side view of an exemplary lateral anchor included in the fastener assembly of FIG. 18, in accordance with certain embodiments.
Figure 27:
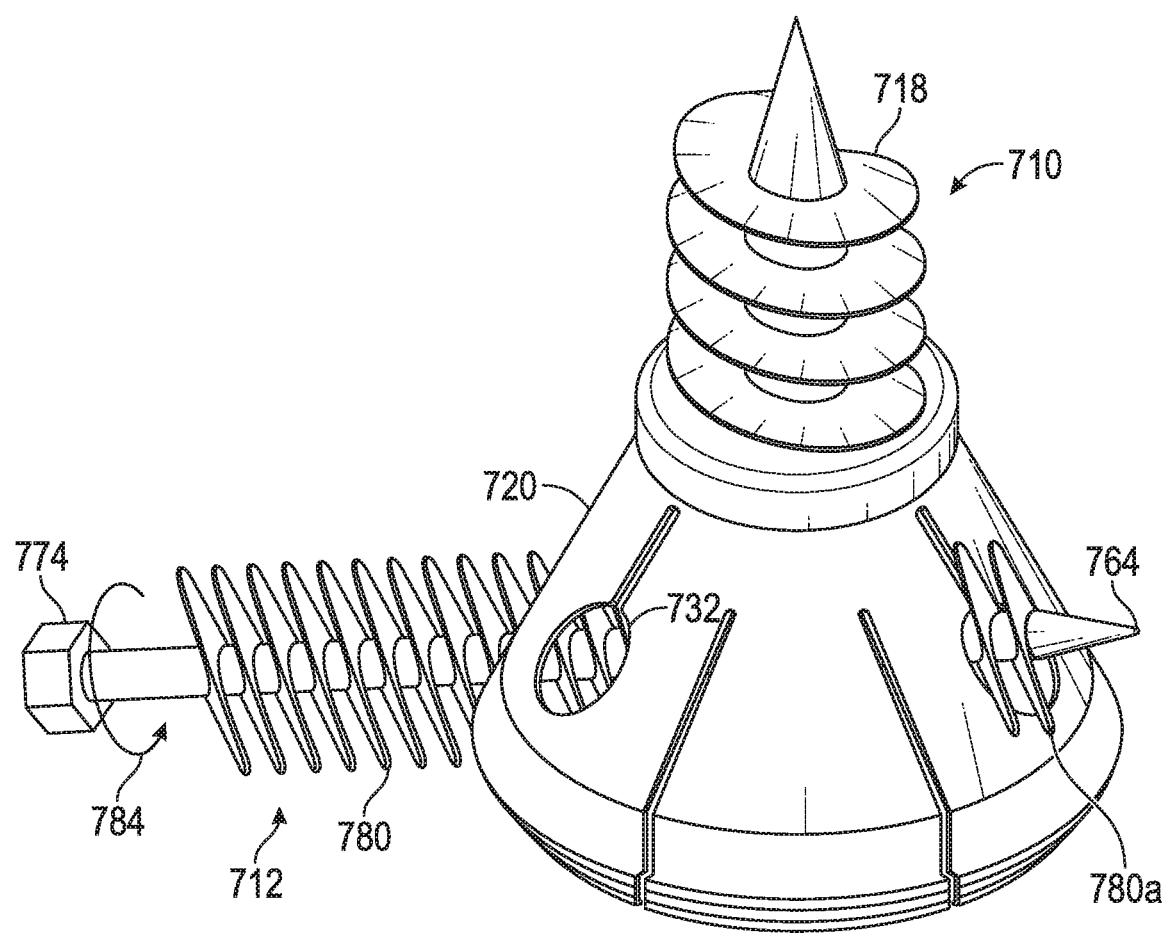
FIGS. 27 through 30 are various perspective views of an exemplary installation process for attaching the lateral anchor of FIG. 26 to the central anchor assembly of FIG. 20, in accordance with certain embodiments.
Figure 28:
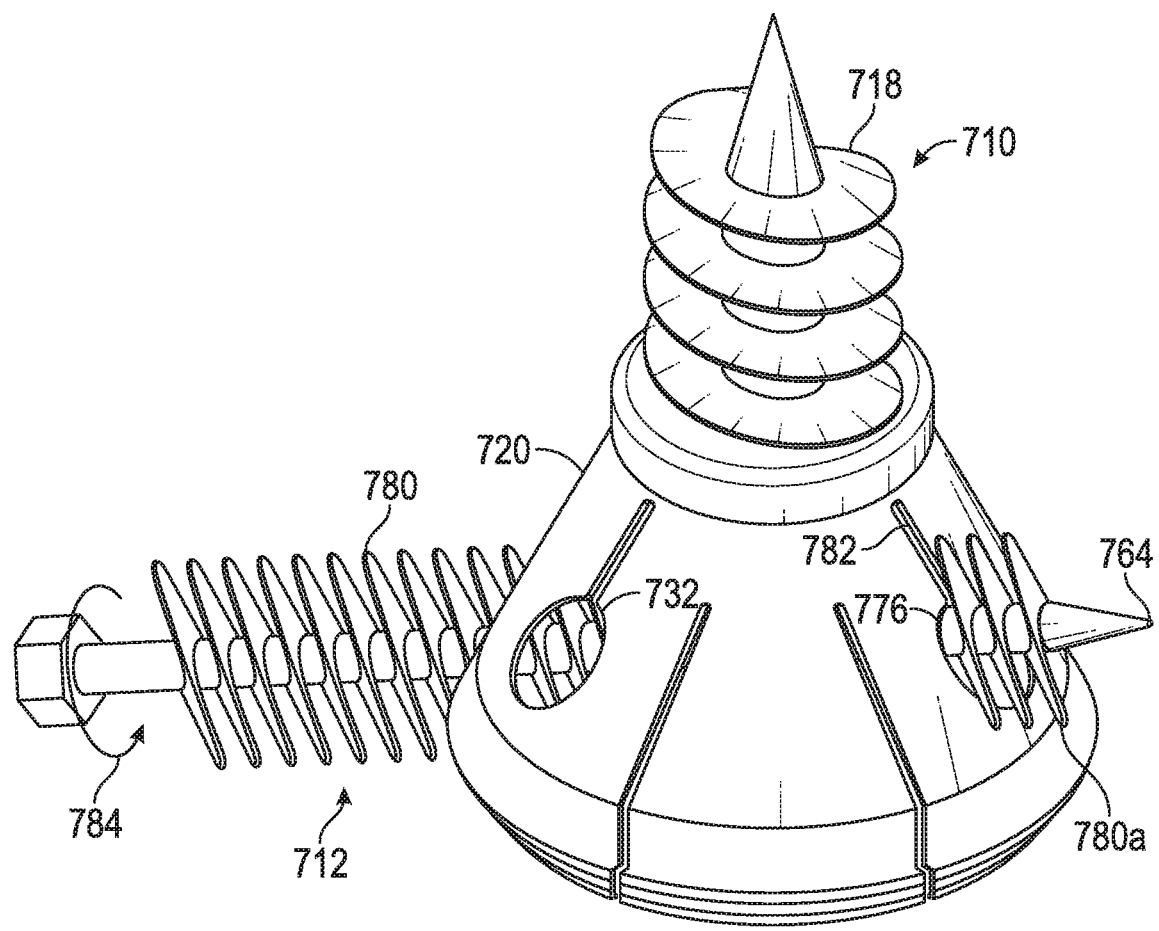
Figure 29:
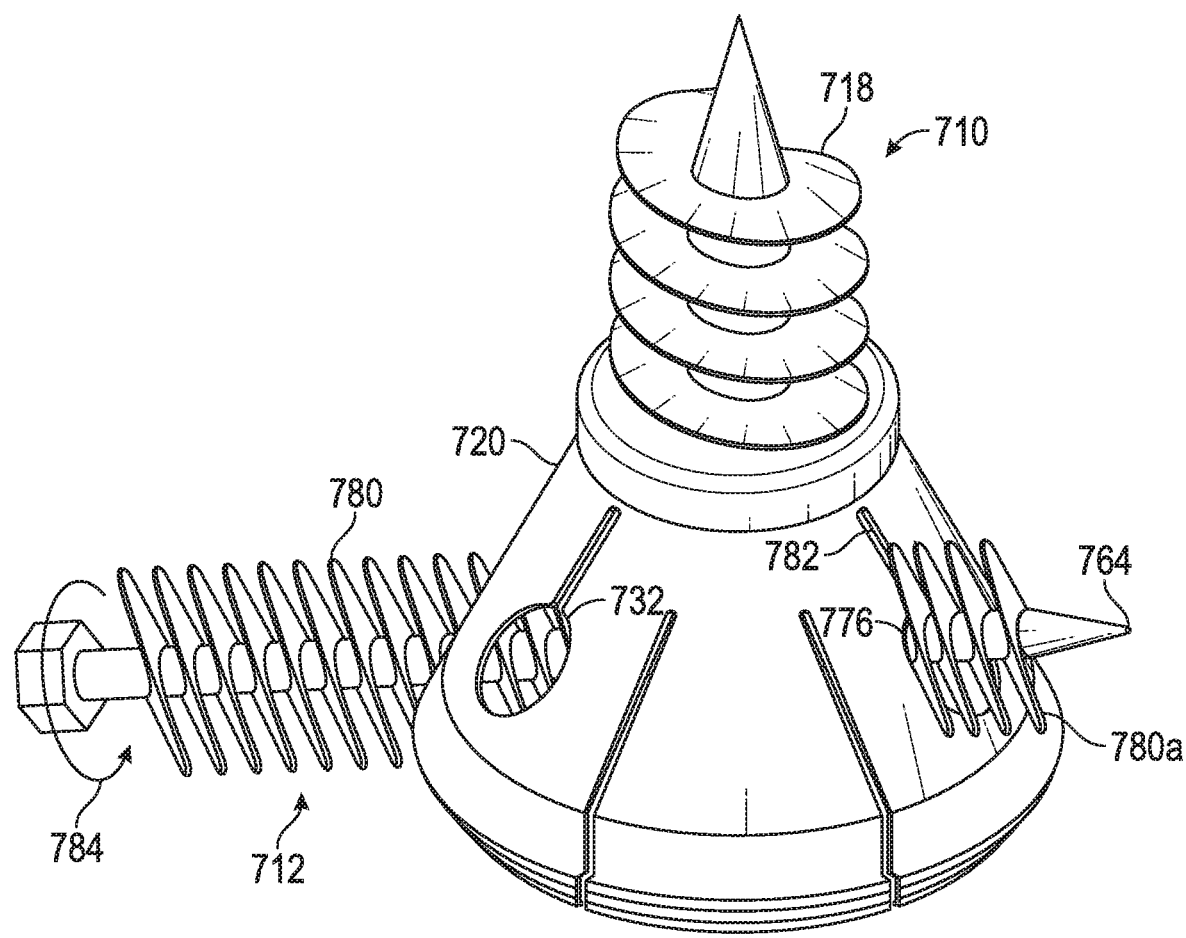
Figure 30:
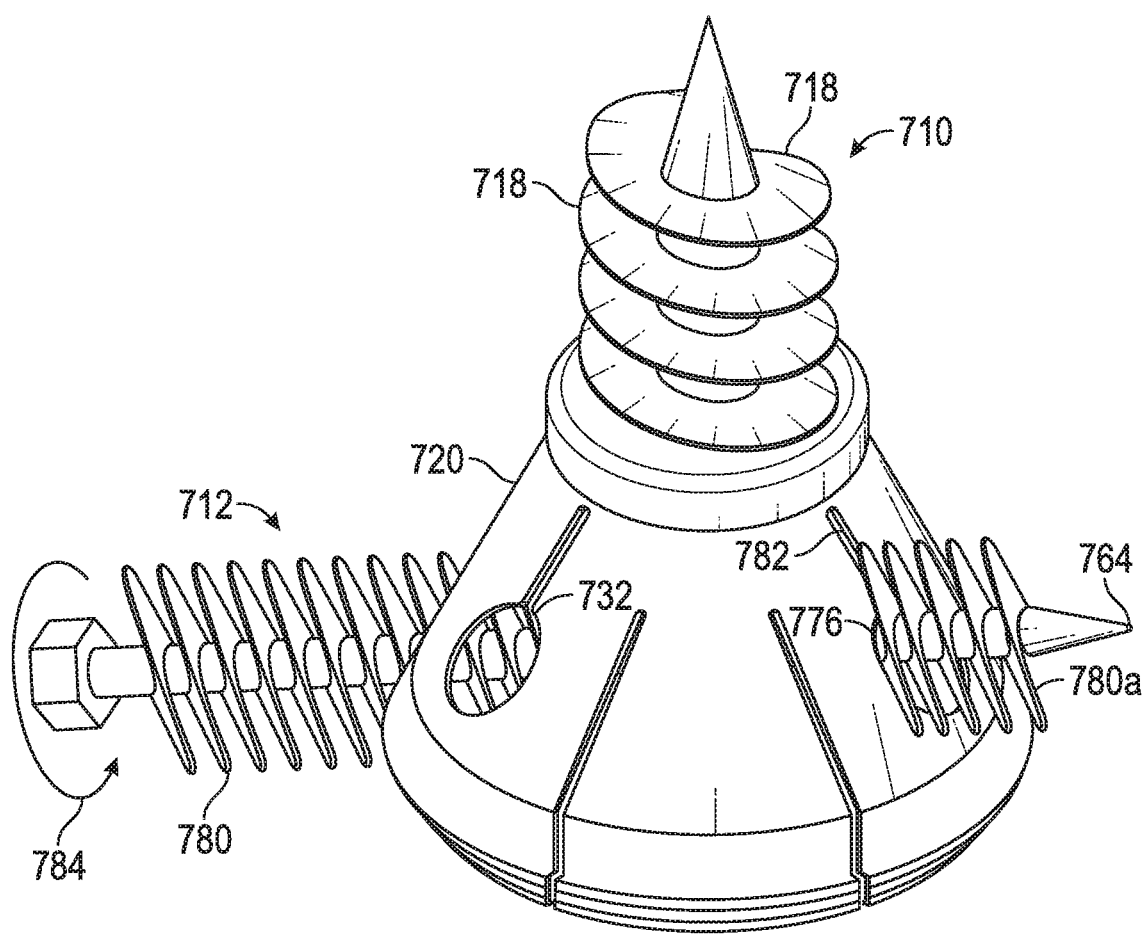

Referring additionally to FIG. 26, shown is an exploded view of an exemplary elongated or lateral anchor 712, in accordance with embodiments. As shown, the lateral anchor 712 comprises a lateral anchor portion 762 (also referred to as an "elongated anchor portion") that may be substantially similar to the anchor portion 718, but for the length. For example, like the anchor portion 718 (also referred to as a "central anchor portion"), the lateral anchor portion 762 has an open end 763, an opposing, closed end 764, and an internal passageway 766 extending between the two ends.

As also shown in FIG. 19A, the lateral anchor 712 further comprises a lateral fastener 768 (also referred to as a "elongated screw") configured for insertion through the open end 763 and into the internal passageway 766. In some embodiments, the internal passageway 766 may include a threaded interior wall 770 configured to engage a threaded portion 772 of the lateral fastener 768, in order to securely couple the fastener 768 to the passageway 766 (e.g., similar to the internal passageway 114 shown in FIG. 2). A head portion 774 of the lateral fastener 712 can be configured (e.g., dimensioned) to be larger than at least a rounded portion 776 of the aperture 732 included in the mating portion 720, for example, to prevent the lateral fastener 712 from passing through the aperture 732 or otherwise becoming decoupled from the central anchor assembly 710, after installation. In some embodiments, the lateral fastener 768 may be coupled to the lateral anchor portion 762 prior to coupling the lateral anchor 712 to the mating portion 720. In other embodiments, the lateral fastener 768 may be fixedly attached to the lateral anchor portion 762 during manufacturing or otherwise pre-assembled.

Referring back to FIG. 26, the lateral anchor portion 762 has a threaded outer wall comprised of a shank 778 and a generally helical arrangement of one or more threads 780 projecting radially outwards along an extent of the shank 778. As shown in FIG. 19A, the shank 778 extends from the open end 763, is hollow inside to provide the internal passageway 766, and terminates at a pointed tip to form the opposing closed end 764. In some embodiments, the shank 778 may taper from the open end 763 to the closed end 764, such that the overall diameter of the lateral anchor portion 762 also tapers down. For example, in one embodiment, a minimum diameter of the shank 778 may be about ⅜ inch and a maximum diameter of the shank 778 may be about one inch.

The pointed end 764 and the threaded arrangement, or thread(s) 780, can be configured to cut into the internal thickness 714 during insertion of the lateral anchor 712 there through, and once installed, the threaded outer wall can grip the internal thickness 714 to prevent slippage or movement of the lateral anchor portion 762, thereby securing the lateral anchor 712 in place (e.g., similar to the anchor portion 718). In a preferred embodiment, the one or more threads 780 is a single start thread that is continuously arranged about an extent of the shank 778 in a helical or spiral manner, for example, similar to the anchor portion 718.

After installation of the central anchor assembly 710 within the wall structure 702, the lateral anchors 712 can be individually coupled to the mating portion 710 of the central anchor assembly. Each of the apertures 732 may be substantially identical to each other (e.g., in shape and size). Likewise, each of the lateral anchors 712 may be substantially identical to each other. Thus, any one of the anchors 712 can be coupled to any one of the apertures 732.

Referring additionally to FIGS. 27 through 30, shown are exemplary positions of a given lateral anchor 712 while a user couples the lateral anchor 712 to a given aperture 732 of the central anchor assembly 710, in accordance with embodiments. Not shown is an initial stage of the coupling process where the closed end 764 of the lateral anchor 712 is inserted into the aperture 732 and the user presses or pushes the lateral anchor 712 forward so that the pointed tip cuts through a first extent of the internal thickness 714. Once the pointed end 764 clears the aperture 732, the user simultaneously presses and turns the lateral anchor 712 into the wall structure 702 in order to cause the threaded outer wall to cut through the internal thickness 714 and make a path for the lateral anchor 712 therein.

Referring back to FIGS. 20 and 21, in embodiments, the apertures 732 included in the mating portion 720 can be configured to receive the threaded outer wall as the lateral anchor 712 is turned or twisted into and through the aperture 732 during installation. For example, in the illustrated embodiment, each aperture 732 includes the rounded portion 776 and an elongated portion 782 in communication with the rounded portion 776. The rounded portion 776 (also referred to herein as a "first portion") may be a substantially round hole configured (e.g., sized and shaped) to allow passage of the closed end 764 of the lateral anchor 712 there through. For example, a diameter of the rounded portion 776 can be selected based on a minimum diameter of the shank 778.

The elongated portion 782 (also referred to herein as a "second portion") may be an elongated opening that starts at one side of the round hole and extends a distance away from the round hole, so as to form a keyhole shape. In embodiments, said distance from the rounded portion 776 may be selected to accommodate the threaded outer wall of the lateral anchor 712, or more specifically, allow passage of the thread 780 there through. For example, a height of the elongated opening 782 may be configured or selected according to a height of the thread 780, or a distance from the outer wall 778 to a top of the thread 780. In the illustrated embodiment, the elongated opening extends from a top side of the round hole towards the anchor portion 718. In other embodiments, the orientation of the aperture 732 may be reversed or otherwise altered.

Thus, an overall distance from a distal end of the rounded portion 776 to an opposite end of the elongated portion 782 can be configured or selected to enable passage of the threaded outer wall through the aperture 732. In addition, each aperture 732 can also be configured (e.g., sized and shaped) to receive the threaded outer wall only when the lateral anchor 712 is turned or twisted in a first direction 784 through the aperture 732. For example, as shown in FIGS. 27 through 30, the threaded outer wall passes through the aperture 732 segment by segment as the lateral anchor 712 continues to be turned in the first direction 784. In some embodiments, the single start thread 780 is a right hand thread and therefore, the lateral anchor 712 must be rotated in a clockwise direction in order to insert the thread 780 into the elongated opening 782 and keep the thread 780 moving through the aperture 732.

More specifically, though not shown, after the closed end 764 is full inserted through the rounded portion 776, a first segment 780a of the thread 780 is initially aligned with, and inserted at least partially through, the elongated opening 782. Next, the lateral anchor 712 is rotated in the first direction 784 until the first segment 780a has fully passed through the elongated opening 782, for example, as shown in FIG. 26. From there, each rotation of the lateral anchor 712 in the first direction 784 causes more and more continuous segments of the threaded outer wall to pass through the aperture 732 in a spiraling manner, for example, as shown from FIGS. 26 to 30. This spiraling movement enables the lateral anchor 712 to drill into the internal thickness 714. In addition, the user may continue to apply pressure while rotating the lateral anchor 712 into the aperture 732 to make sure the pointed end 764 and threaded outer wall cut through the internal thickness 714.

As will be appreciated, the user may stop rotating the lateral anchor 712 once the head portion 774 is flush with, or tightened, against the mating portion 720 and/or the bracket 774. Once the lateral anchor 712 is embedded within the wall structure 702, the anchor 712 cannot be easily removed, for example, by simply pulling on the lateral anchor 712 or due to any other downward force or tension load. In fact, in such cases, the only way to remove the anchor 712 from the mating portion 720 is to rotate the lateral anchor 712 in a second direction opposite the first direction 784 until the lateral anchor 712 becomes unscrewed from the aperture 732.

Though not shown in FIGS. 18 and 19, the fastener assembly 700 may be coupled to one or more strut assemblies for carrying or supporting one or more supported elements, such as, for example, a pipe, conduit, tube, etc. (e.g., similar to the supported element 306 shown in FIG. 3). The strut assembly may be coupled to a receiving portion of the external assembly 706, such as, e.g., a portion of the elongated fastener 708 disposed between the spacer 746 and head 708b of the fastener 708. The various components of the fastener assembly 700 may be configured to withstand the weight of the supported elements and/or strut assemblies and any force exerted by the same, without causing damage to or weakening the wall structure 702 (e.g., via buckling, cracking, breakage, spaulding, etc.), as described herein.

Figure 31:
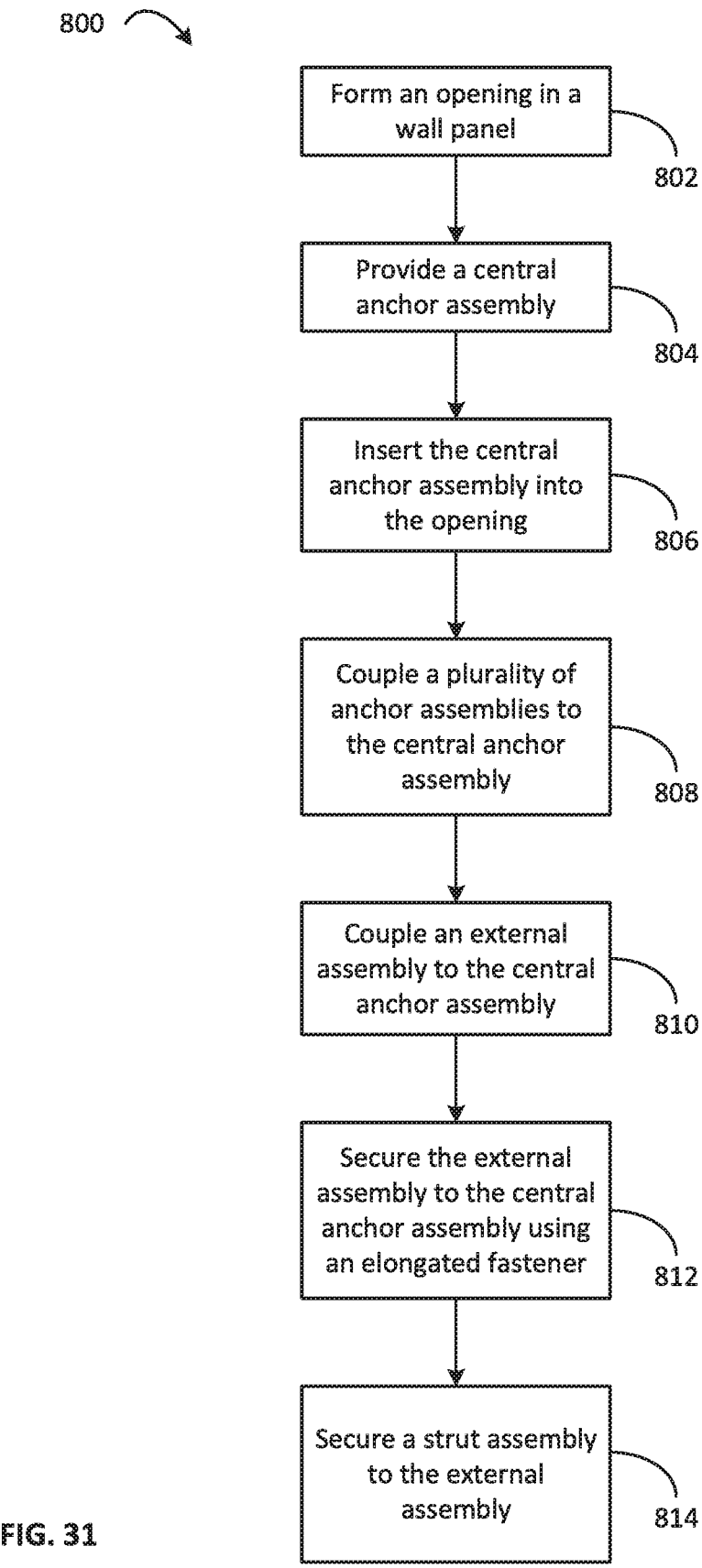
FIG. 31 is flow diagram for another exemplary method of mounting a supported element to a wall structure, in accordance with certain embodiments.

FIG. 31 illustrates an exemplary method 800 of mounting a supported element to a wall structure having an internal thickness, in accordance with embodiments. As an example, the method 800 may be used to mount a strut assembly coupled to a pipe, conduit, or tube (e.g., strut assembly 304 shown in FIG. 3) to a laminated foam wall (e.g., wall panel 702 shown in FIG. 18) using a fastener assembly (e.g., fastener assembly 700 shown in FIG. 18). In embodiments, the wall structure is a ceiling panel, and the strut assembly is configured to mount a supported element to said ceiling panel.

The method 1000 may begin at step 802 with forming a first opening or hole (e.g., hole 717 shown in FIG. 19A) through a laminate cover or outer wall panel (e.g., thin wall panel 716 shown in FIG. 19A) of the wall structure. The hole may be deep enough only to penetrate through the outer wall panel but not through the compressible material residing behind the panel (e.g., internal thickness 714 shown in FIG. 19A). The hole may have a first diameter (or "characteristic diameter") that determines or is determined by the dimensions of other components of the fastener assembly, such as, e.g., a diameter associated with a washer projection (e.g., projection 742 shown in FIG. 18) and/or a diameter of a mating portion (e.g., outer diameter of the mating portion 720 shown in FIG. 19A). Thus, in some embodiments, the step of forming an opening in the laminate cover includes forming a hole in the outer wall panel that is sized to receive at least one of the mating portion or the washer projection. The opening may be pre-drilled or may be created during installation of the mounting assembly. As an example, the hole may be formed using a hole saw with a diameter of approximately 2.5 inches to 2⅜ inches to drill a hole vertically upwards into the ceiling panel.

Though not shown in FIG. 31, in some embodiments, the method 800 further comprises forming a second opening in the wall structure in order to remove some of the compressible material (e.g., foam) from the internal thickness of the wall. For example, an auger, flat spade bit, or other appropriate tool may be used to remove a funnel-shaped section of foam from the wall structure, in order to carve out a counter sink or otherwise make room for the mating portion shown in FIG. 20. A bottom diameter of the second opening may be configured to substantially match a diameter of the first opening formed in step 802, while a top diameter of the second opening may be smaller to form the funnel shape. In one embodiment, for example, the top diameter may be 1 to 1.5 inches.

Step 804 includes providing a central anchor assembly (e.g., central anchor assembly 710 shown in FIG. 20) with an anchor portion (e.g., anchor portion 718 shown in FIG. 20) fixedly attached to a mating portion (e.g., mating portion 720 shown in FIG. 20) adjacent an open end of the anchor portion. The anchor portion can further comprise a closed end (e.g., closed end 722 shown in FIG. 20) opposite the open end and an elongated internal passageway (e.g., internal passageway 723 shown in FIG. 19A) extending between the two ends. The central anchor assembly may be created using injection molding techniques or other appropriate manufacturing techniques.

Step 806 includes inserting the central anchor assembly into the hole and through the internal thickness of the wall structure until a bottom end (e.g., second end 728 shown in FIG. 19A) of the mating portion engages the outer wall panel. In some embodiments, the central anchor assembly is secured to the wall structure by screwing the anchor portion into the internal thickness using a drill with an appropriately sized bit (e.g., 9/16 hex bit) coupled to a drive head of the anchor portion (e.g., drive head 222 shown in FIG. 13). In embodiments, inserting the central anchor assembly into the hole includes forcing an extent of the second end of the mating portion inwards as the mating portion passes through the hole, said second end springing back to an initial state once said extent clears the hole. For example, the mating portion may have a plurality of individually moveable elements (e.g., moveable elements 736 shown in FIG. 20) that are configured to contract or be compressed as the mating portion passes through the hole and expand back when an outer rim (e.g., rim 738 shown in FIG. 20) clears the hole, as described herein. In such cases, the central anchor assembly may be driven into the hole by the drill bit until the outer rim just passes through the hole.

Though not shown, the method 800 can also include coupling a reinforcement element (e.g., bracket 754 shown in FIG. 25) to the central anchor assembly to add strength to the mating portion. The reinforcement element may be coupled to an underside of the mating portion (e.g., as shown in FIG. 19A) using adhesive or any other appropriate attachment mechanism. During said coupling, a plurality of apertures (e.g., angles apertures 758 shown in FIG. 25) included in the reinforcement element may be aligned with a plurality of apertures included in the mating portion, to permit the elongated anchors to pass there through, as described below.

Step 808 includes coupling each of a plurality of elongated anchors (e.g., lateral anchors 7102 shown in FIG. 18) to the mating portion at an oblique angle relative to a central axis (e.g., axis 713 shown in FIG. 18) of the anchor portion. Each elongated anchor has a threaded outer wall and a closed end (e.g., closed end 764 shown in FIG. 26) configured to cut into the internal thickness of the wall structure as the elongated anchor is inserted into the wall structure. In some embodiments, for each of the elongated anchors, coupling the elongated anchor to the mating portion comprises inserting the closed end of said elongated anchor through a respective one of a plurality of apertures (e.g., apertures 732 shown in FIG. 20) positioned at equidistant intervals around the mating portion, and rotating said elongated anchor in a first direction (e.g., first direction 784 shown in FIGS. 27-30) so that the threaded outer wall of the elongated anchor passes through the aperture. The threaded outer wall of each elongated anchor comprises a shaft (e.g., shaft 778 shown in FIG. 26) and a single start thread (e.g., thread 780 shown in FIG. 26) helically arranged about an extent of said shaft, the shaft terminating at a pointed tip to form the closed end. Each aperture can include a round hole (e.g., rounded portion 776 shown in FIG. 20) in communication with an elongated opening (e.g., elongated portion 782 shown in FIG. 20). In some embodiments, the round hole has a diameter selected based on a diameter of the shaft, and the elongated opening has a height selected based on a height of the thread. In such cases, the closed pointed end may pass through the round hole first, and the thread may pass through the elongated opening, segment by segment, as the lateral anchor is rotated in the first direction.

Step 810 includes coupling an external assembly (e.g., external assembly 706) to the central anchor assembly adjacent the outer wall panel. In some embodiments, coupling the external assembly to the central anchor assembly includes inserting a projection (e.g., washer projection 742) of the external assembly into the bottom end of the mating portion such that an extent of the mating portion is forced outwards relative to the hole formed in the outer wall panel. For example, the mating portion may include a protrusion that extends down from the bottom end of the mating portion and into the external assembly, said protrusion being forced outwards relative to the hole when the external assembly is coupled to the internal assembly.

Step 812 includes inserting an elongated fastener (e.g., fastener 708 shown in FIG. 18) through an open center of the external assembly and into the internal passageway of the anchor portion, thereby securing the external assembly to the central anchor assembly. Step 814 includes securing a strut assembly to a receiving portion of the external assembly, the strut assembly being coupled to the supported element and having an open center for receiving the elongated fastener there through. The method 800 may end once the strut assembly is fully secured to the external assembly.

It should be emphasized that the above-described embodiments, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and protected by the following claims.

I claim:

1. A mounting assembly for securing a supported element to a wall structure having an outer wall panel and an internal thickness, the mounting assembly comprising:
   an internal assembly configured to engage the internal thickness of the wall structure, the internal assembly comprising:
     a central anchor assembly comprising:
       an anchor portion configured for insertion into the internal thickness of the wall structure, the anchor portion having an open end, an opposing closed end, and an internal passageway extending between the open and closed ends, and
       a mating portion annularly arranged about said open end of the anchor portion, the mating portion having a first end fixedly attached to the anchor portion adjacent the open end and an opposing second end configured to engage the outer wall panel; and
     a plurality of elongated anchors configured for attachment to the mating portion at an oblique angle relative to a central axis of the anchor portion, each elongated anchor having a threaded outer wall and a closed pointed end configured to cut into the internal thickness of the wall structure;
   an external assembly comprising an open center and configured to engage the outer wall panel and the mating portion of the central anchor assembly; and
   an elongated fastener configured to secure the external assembly to the internal assembly, the elongated fastener extending through the open center of the external assembly and into the internal passageway of the anchor portion.

2. The mounting assembly of claim 1, wherein the external assembly further comprises a projection disposed annularly around the open center and configured for insertion into the second end of the mating portion, the projection engaging an extent of the mating portion upon coupling the external assembly to the internal assembly.

3. The mounting assembly of claim 2, wherein engagement of the mating portion by the projection forces said extent of the mating portion radially outwards, thus enlarging an outer diameter of the second end of the mating portion.

4. The mounting assembly of claim 3, wherein the projection comprises a beveled surface having a first diameter that is less than an inner diameter of the second end of the mating portion and a second diameter that is greater than the inner diameter.

5. The mounting assembly of claim 1, wherein the mating portion further comprises a protrusion configured to extend out from the second end of the mating portion opposite the anchor portion and engage the external assembly.

6. The mounting assembly of claim 5, wherein said protrusion is configured to extend outside the wall structure adjacent the outer wall panel upon securing a remainder of the central anchor assembly within the wall structure, the external assembly further comprising a groove disposed annularly around the open center for receiving said protrusion.

7. The mounting assembly of claim 1, wherein during insertion of the central anchor assembly into the wall structure, engagement of the outer wall panel by the mating portion forces an extent of the second end of the mating portion inwards, said second end springing back to an initial state once said extent clears the outer wall panel.

8. The mounting assembly of claim 1, wherein the mating portion comprises a plurality of individually movable elements cooperating to form the second end of the mating portion, each element being configured to move inwards and/or outwards during engagement of the mating portion with the outer wall panel and engagement of the external assembly with the mating portion.

9. The mounting assembly of claim 1, wherein the mating portion comprises a plurality of apertures positioned at equidistant intervals around said mating portion, each aperture configured to receive a respective one of the plurality of elongated anchors.

10. The mounting assembly of claim 9, wherein the plurality of apertures includes at least three apertures.

11. The mounting assembly of claim 9, wherein the threaded outer wall of each elongated anchor comprises a shaft and a single start thread helically arranged about an extent of the shaft, the shaft terminating at a pointed tip to form the closed end, and wherein each aperture of the mating portion comprises a first portion configured to allow passage of the closed pointed end of the corresponding elongated anchor there through, and a second portion configured to enable passage of the thread of said elongated anchor there through.

12. The mounting assembly of claim 11, wherein the first portion is a substantially round hole and the second portion is an elongated opening in communication with the round hole, and a distance from a bottom of the round hole to a top of the elongated opening is selected to enable passage of the threaded outer wall through the aperture as the elongated anchor is turned in a first direction.

13. The mounting assembly of claim 12, wherein a diameter of the round hole is selected based on a diameter of the shaft, and a height of the elongated opening is selected based on a height of the thread.

14. The mounting assembly of claim 1, wherein the central anchor assembly is coupled to the wall structure by inserting the anchor portion into a hole formed in the wall structure and by twisting the anchor portion so that the closed end cuts through the internal thickness of the wall structure.

15. The mounting assembly of claim 14, wherein the anchor portion further comprises a threaded outer wall configured to cut into the internal thickness of the wall structure and secure the anchor portion therein.

16. The mounting assembly of claim 1, wherein the external assembly further comprises a receiving portion for securing a strut assembly to the mounting assembly.

17. The mounting assembly of claim 1, wherein the central anchor assembly further comprises a reinforcement element coupled to an underside of the mating portion and having a plurality of apertures configured to align with the plurality of apertures included in the mating portion.

18. A method of mounting a supported element to a wall structure having an outer wall panel and an internal thickness, the method comprising:
    forming a hole having a first diameter through the outer wall panel;
    providing a central anchor assembly with an anchor portion fixedly attached to a mating portion adjacent an open end of the anchor portion, said anchor portion further comprising a closed end opposite the open end and an elongated internal passageway extending between the open and closed ends;
    inserting the central anchor assembly into the hole and through the internal thickness of the wall structure until a bottom end of the mating portion engages the outer wall panel;
    coupling each of a plurality of elongated anchors to the mating portion at an oblique angle relative to a central axis of the anchor portion, each elongated anchor having a threaded outer wall and a closed end configured to cut into the internal thickness of the wall structure as the elongated anchor is inserted into the wall structure;
    coupling an external assembly to the central anchor assembly adjacent the outer wall panel; and
    inserting an elongated fastener through an open center of the external assembly and into the internal passageway of the anchor portion, thereby securing the external assembly to the central anchor assembly.

19. The method of claim 18, further comprising:
    securing a strut assembly to a receiving portion of the external assembly, the strut assembly being coupled to the supported element and having an open center for receiving the elongated fastener there through.

20. The method of claim 18, wherein coupling the external assembly to the central anchor assembly includes inserting a projection of the external assembly into the bottom end of the mating portion such that an extent of the mating portion is forced outwards relative to the hole formed in the outer wall panel.

21. The method of claim 18, wherein inserting the central anchor assembly into the hole includes forcing an extent of the bottom end of the mating portion inwards as the mating portion passes through the hole, said bottom end springing back to an initial state once said extent clears the hole.

22. The method of claim 18, wherein for each of the elongated anchors, coupling the elongated anchor to the mating portion comprises:
    inserting the closed end of said elongated anchor through a respective one of a plurality of apertures positioned at equidistant intervals around the mating portion, and
    rotating said elongated anchor in a first direction so that the threaded outer wall of the elongated anchor passes through the aperture.

23. The method of claim 22, wherein the threaded outer wall of each elongated anchor comprises a shaft and a single start thread helically arranged about an extent of said shaft, the shaft terminating at a pointed tip to form the closed end, and each aperture includes a round hole in communication with an elongated opening, the round hole having a diameter selected based on a diameter of the shaft and the elongated opening having a height selected based on a height of the thread.

24. A mounting assembly for securing a supported element to a wall structure having an outer wall panel and an internal thickness, the mounting assembly comprising:
    an internal assembly configured to engage the internal thickness of the wall structure and handle tension loads applied to the supported element, the internal assembly comprising a plurality of anchors configured to cut into the internal thickness and extend out at different angular directions relative to a central axis of the internal assembly;
    an external assembly configured to engage the outer wall panel and a mating portion of the internal assembly, and handle sheer loads applied to the supported element, the external assembly comprising a projection configured to apply a radially outward force against an extent of the mating portion upon coupling the external assembly to the internal assembly; and
    an elongated fastener for coupling the external assembly to the internal assembly, the elongated fastener extending through an open center of the external assembly and into an internal passageway of the internal assembly.

25. The mounting assembly of claim 24, wherein the mating portion comprises a plurality of apertures configured to receive respective anchors and cause each anchor to extend out from the mating portion in the corresponding angular direction.

26. The mounting assembly of claim 25, wherein each anchor comprises a threaded outer wall, and each aperture is configured to allow passage of the corresponding threaded outer wall there through.

27. The mounting assembly of claim 24, wherein the mating portion comprises a plurality of individually movable elements cooperating to form a bottom end of the mating portion, each element being configured to move radially outwards during engagement of the projection with the mating portion.

* * * * *